US012767289B2

(12) United States Patent
Ito et al.

(10) Patent No.: US 12,767,289 B2
(45) Date of Patent: Oct. 20, 2026

(54) DISPLAY CONTROL METHOD FOR MANEUVERING FUNCTION DISPLAY IN MARINE VESSEL CAPABLE OF EXECUTING VARIOUS MANEUVERING FUNCTIONS AND MANEUVERING SYSTEM OF MARINE VESSEL

(71) Applicant: YAMAHA HATSUDOKI KABUSHIKI KAISHA, Iwata (JP)

(72) Inventors: Makoto Ito, Shizuoka (JP); Daisuke Okamura, Shizuoka (JP); Kota Tokuda, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 19/225,252

(22) Filed: Jun. 2, 2025

(65) Prior Publication Data

US 2025/0289540 A1 Sep. 18, 2025

Related U.S. Application Data

(63) Continuation-in-part of application No. 18/928,639, filed on Oct. 28, 2024.

(30) Foreign Application Priority Data

Nov. 24, 2023 (JP) ................................ 2023-199127

(51) Int. Cl.

| | |
|---|---|
| ***B63B 45/00*** | (2006.01) |
| ***B63B 35/00*** | (2020.01) |
| ***B63B 49/00*** | (2006.01) |
| ***G06F 3/041*** | (2006.01) |
| ***G06F 3/0488*** | (2022.01) |

(52) U.S. Cl.

CPC .............. *B63B 45/00* (2013.01); *B63B 35/00* (2013.01); *B63B 49/00* (2013.01); *G06F 3/041* (2013.01); *G06F 3/0488* (2013.01); *B63B 2035/008* (2013.01); *B63B 2201/00* (2013.01)

(58) Field of Classification Search

CPC ......... B63B 49/00; B63B 35/00; B63B 45/00; B63B 2201/00; B63B 2035/008; G06F 3/04847; G06F 3/0488; G06F 3/041; B63H 2025/022

See application file for complete search history.

(56) References Cited

U.S. PATENT DOCUMENTS 8,836,544 B1 * 9/2014 Balogh .................. B60L 58/18 340/459

12,263,915 B1 * 4/2025 Koetsier ................ B63B 21/26

OTHER PUBLICATIONS

Ito et al., "Display Control Method for Maneuvering Function Display in Marine Vessel Capable of Executing Various Maneuvering Functions and Maneuvering System of Marine Vessel", U.S. Appl. No. 18/928,639, filed Oct. 28, 2024.

* cited by examiner

*Primary Examiner* — Deeprose Subedi

(74) *Attorney, Agent, or Firm* — Keating & Bennett, LLP

(57) ABSTRACT

A display control method controls a plurality of maneuvering function displays to display maneuvering functions of a marine vessel. The display control method includes changing a maneuvering function displayed on each of the plurality of maneuvering function displays based on at least one of a start state of a marine propulsion device of the marine vessel or an operation state of an operator of the marine vessel.

6 Claims, 29 Drawing Sheets

11

DISPLAY CONTROL METHOD FOR MANEUVERING FUNCTION DISPLAY IN MARINE VESSEL CAPABLE OF EXECUTING VARIOUS MANEUVERING FUNCTIONS AND MANEUVERING SYSTEM OF MARINE VESSEL

CROSS REFERENCE TO RELATED APPLICATIONS

This application is a continuation-in-part of U.S. patent application Ser. No. 18/928,639, filed Oct. 28, 2024, which claims the benefit of Japanese Patent Application No. 2023-199127, filed Nov. 24, 2023, each of which is hereby incorporated by reference herein in its entirety.

BACKGROUND OF THE INVENTION

1. Field of the Invention

The present invention relates to display control methods for maneuvering function displays in marine vessels capable of executing various maneuvering functions and maneuvering systems of marine vessels.

2. Description of the Related Art

In recent years, in a small marine vessel, functions (hereinafter, referred to as "maneuvering functions") related to executable maneuvering, for example, maneuvering modes, have increased. Correspondingly, a plurality of physical switches for executing various maneuvering functions are arranged on a console panel in a cockpit. On the other hand, since a vessel steering mechanism, a remote controller, a joystick, and/or a multi function display (MFD) are disposed on the console panel, it has been difficult to secure a place for disposing a large number of physical switches on the console panel as the maneuvering function increases.

Therefore, there has been proposed a technique in which the MFD is configured by a display having a touch panel function, in which a touch button as a software key corresponding to each maneuvering function is displayed on the MFD, and a desired function is executed by a vessel operator touching the touch button (see, for example, Japanese Laid-open Patent Publication No. 2015-66978). In this technique, a device operation screen displayed on the MFD is switched according to the operation of the vessel operator or the situation of the marine vessel, and the touch button corresponding to each maneuvering function is changed accordingly. In a case where a certain maneuvering function is not enabled, a touch button corresponding to the maneuvering function is displayed in a non-operation state.

However, in the technique described in Japanese Laid-open Patent Publication No. 2015-66978, even when the touch button corresponding to the maneuvering function that is not enabled is in the non-operation state, the touch button remains displayed, and the display position of the touch button does not change. Therefore, in a case where the touch button corresponding to the maneuvering function that is not enabled is present at a position where the vessel operator can easily operate, it is possible for the vessel operator to erroneously operate the touch button, for example. Thus, the technique described in Japanese Laid-open Patent Publication No. 2015-66978 has room for improvement from the viewpoint of usability.

SUMMARY OF THE INVENTION

Example embodiments of the present invention improve usability of maneuvering function displays in marine vessels.

According to an example embodiment of the present invention, a display control method of controlling a plurality of maneuvering function displays to display maneuvering functions of a marine vessel includes changing a maneuvering function displayed on each of the plurality of maneuvering function displays based on at least one of a start state of a marine propulsion device of the marine vessel or an operation state of a manual operator of the marine vessel.

According to this configuration, it is possible to improve the usability of the maneuvering function display.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
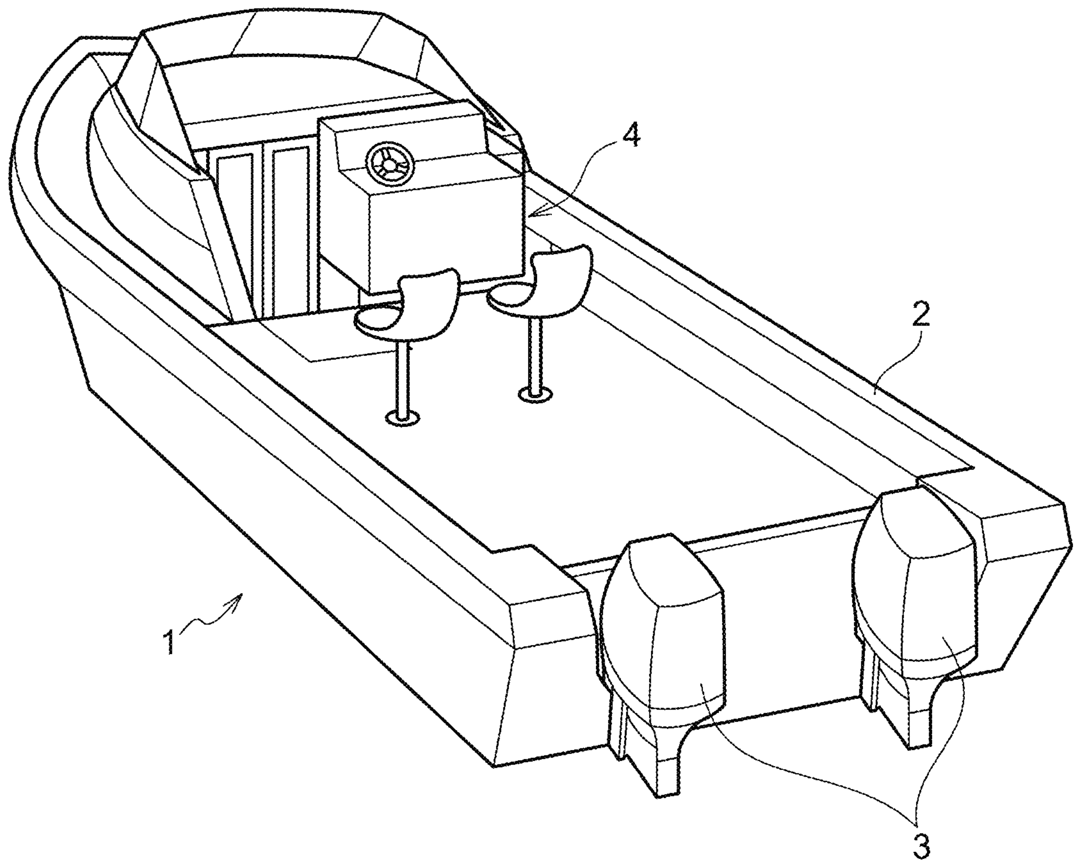
FIG. 1 is a perspective view of a marine vessel including a maneuvering system according to a first example embodiment of the present invention.

Hereinafter, example embodiments of the present invention will be described with reference to the drawings. First, a first example embodiment of the present invention will be described. FIG. 1 is a perspective view of a marine vessel 1 including a maneuvering system 11 according to the first example embodiment of the present invention. The marine vessel 1 includes a hull 2 and two outboard motors 3 (marine propulsion devices) mounted on the hull 2. Each outboard motor 3 includes an engine and a propeller, and generates thrust by rotating the propeller by a driving force of the engine. Note that the number of outboard motors 3 included in the marine vessel 1 is not limited to two, and the marine vessel 1 may include only one outboard motor 3, or the marine vessel 1 may include three or more outboard motors 3. In addition, the marine vessel 1 may include an inboard motor or an inboard/outboard motor as a marine propulsion device instead of the outboard motor 3. Further, the marine vessel 1 may be a jet propulsion boat.

Figure 2:
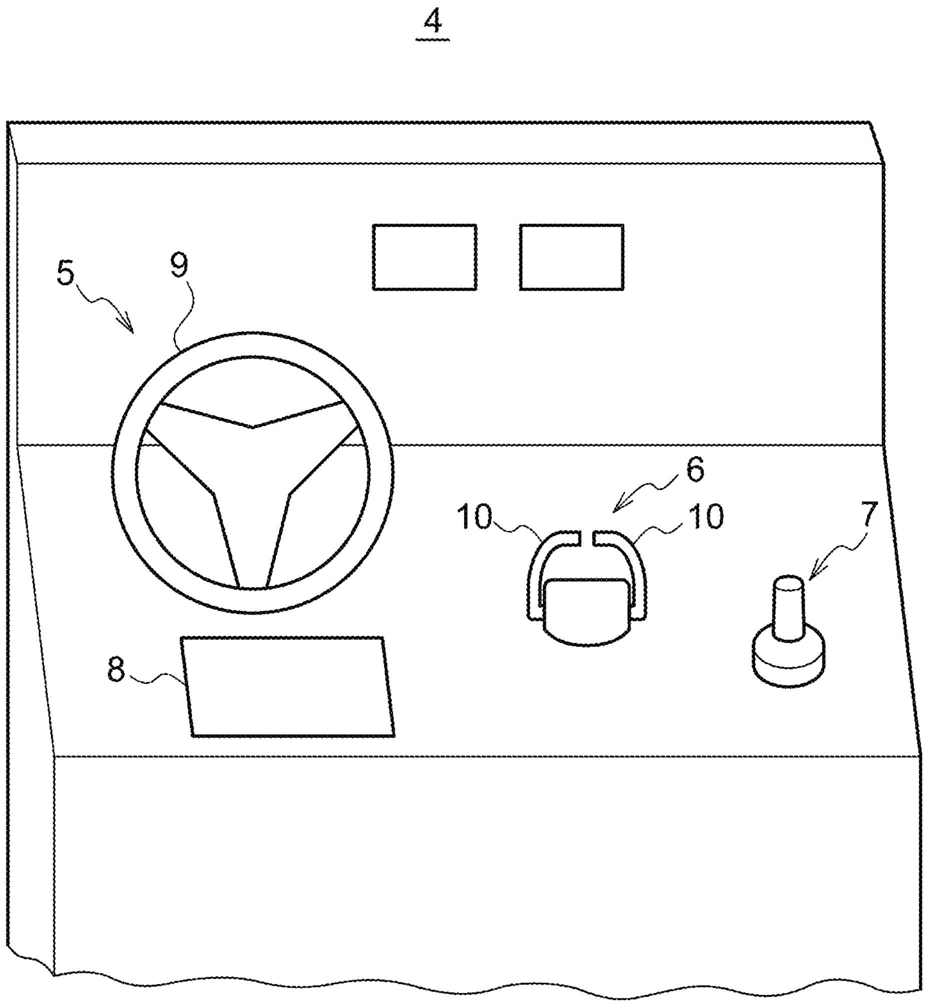
FIG. 2 is a perspective view of main portions of a cockpit in the marine vessel in FIG. 1.

In the marine vessel 1, a cockpit 4 is provided on the bow side which is the front portion of the hull 2. FIG. 2 is a perspective view of main portions of the cockpit 4. A steering mechanism 5, a remote controller 6, a joystick 7, and an MFD 8 are disposed in the cockpit 4.

The steering mechanism 5 is a device for the vessel operator to determine the heading direction of the marine vessel 1. The steering mechanism 5 includes a steering wheel 9 that can be rotated. The vessel operator turns the marine vessel 1 right and left by rotating the steering wheel 9 right and left.

The remote controller 6 includes a lever 10 corresponding to each outboard motor 3. By operating each lever 10, the vessel operator can switch the direction of thrust generated by the corresponding outboard motor 3 between the forward direction and the backward direction, and adjust the output of the corresponding outboard motor 3 to adjust the vessel speed. For example, when the lever 10 is tilted forward in the direction of the "F" position, the corresponding outboard motor 3 generates thrust in the forward direction. When the lever 10 is tilted backward in the direction of the "R" position, the corresponding outboard motor 3 generates thrust in the backward direction. Further, when the lever 10 is located at the "N" position which is located between the "F" position and the "R" position, the connection between the engine and the propeller in the outboard motor 3 is disconnected by a clutch so that the corresponding outboard motor 3 does not generate thrust.

The joystick 7 can be tilted forward, backward, leftward, and rightward, and can be rotated around an axis. By operating the joystick 7, the vessel operator can move the marine vessel 1 along a heading direction corresponding to the tilting direction of the joystick 7 with thrust corresponding to the tilt amount of the joystick 7.

The MFD 8 includes, for example, a color liquid crystal display (LCD) display, and functions to display various types of information and also functions as a touch panel that receives an input from the vessel operator. For example, the MFD 8 displays the rotation speed of the engine of each outboard motor 3 and the vessel speed of the marine vessel 1.

Figure 3:
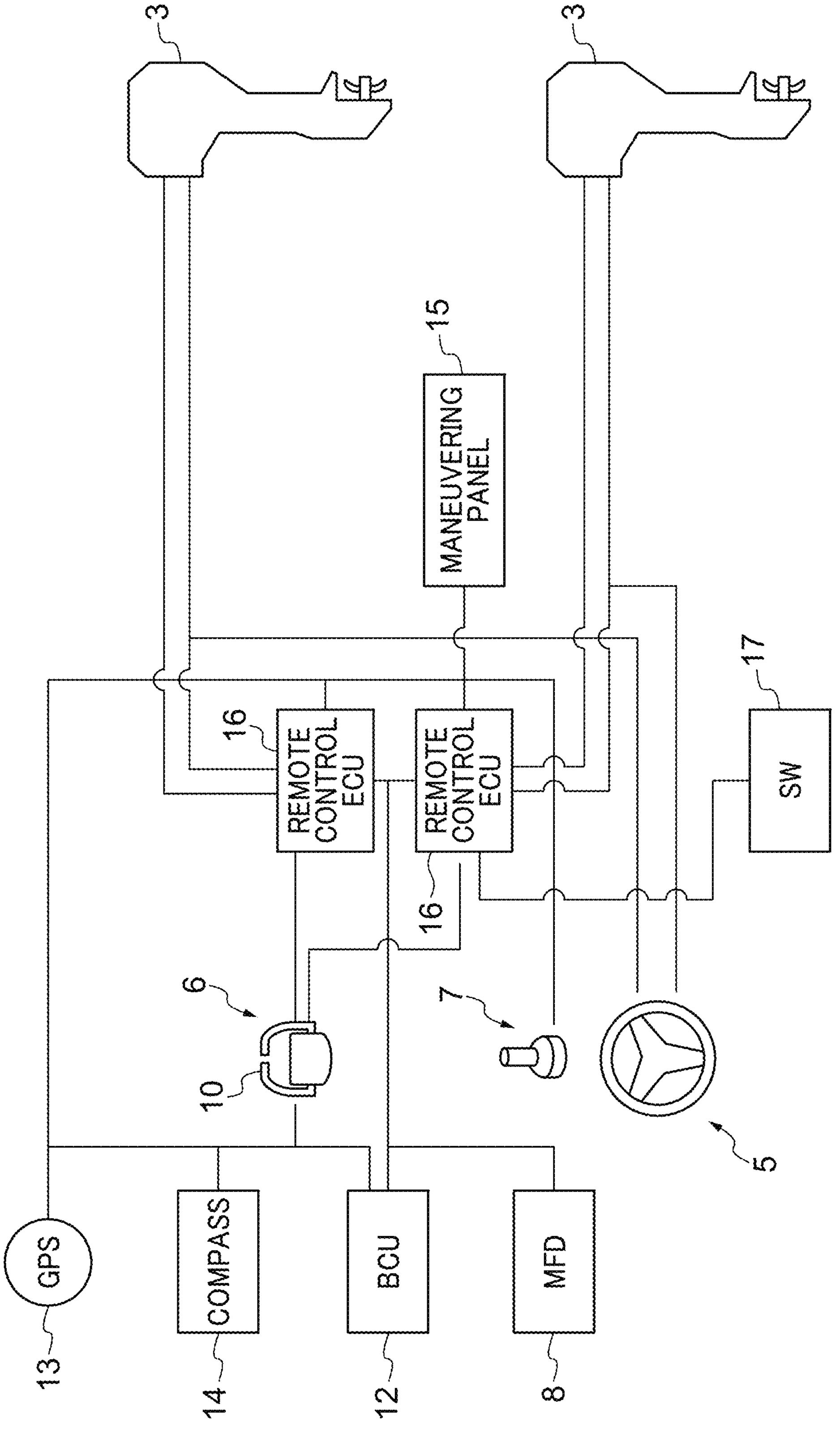
FIG. 3 is a block diagram for schematically explaining a configuration of the maneuvering system included in the marine vessel in FIG. 1.

FIG. 3 is a block diagram for schematically illustrating a configuration of the maneuvering system 11 included in the marine vessel 1 in FIG. 1. In FIG. 3, the maneuvering system 11 includes an outboard motor 3, a boat control unit (BCU) 12 (controller), an MFD 8, a GPS 13, a compass 14, a remote controller 6, a joystick 7, a steering mechanism 5, a maneuvering panel 15, a remote control ECU 16, and a switch (SW) 17. The components of the maneuvering system 11 are communicably connected to each other.

The GPS 13 determines the current position of the marine vessel 1 and transmits the current position of the marine vessel 1 to the BCU 12 as position information. The compass 14 determines the azimuth (direction of the bow) of the marine vessel 1 and transmits the azimuth of the marine vessel 1 to the BCU 12. The steering mechanism 5 receives the steering operation of the vessel operator and transmits a steering angle signal corresponding to the received operation to each remote control ECU 16. The switch 17 receives an instruction to turn on and start each outboard motor 3, and transmits a signal corresponding to the received instruction to the BCU 12 and each remote control ECU 16.

The BCU 12 determines the situation of the marine vessel 1 based on the signals transmitted from the respective components of the maneuvering system 11, determines the thrust to be generated by each outboard motor 3 and the acting direction of the thrust to be taken, and transmits a control signal to each remote control ECU 16. One remote control ECU 16 is provided corresponding to one outboard motor 3, and controls an engine and/or a steering mechanism (not illustrated) of the corresponding outboard motor 3 according to a signal transmitted from the BCU 12, the remote controller 6, the joystick 7, or the like, to adjust the thrust of the outboard motor 3 and the acting direction of the thrust. Therefore, in the maneuvering system 11, the vessel operator can control the vessel speed and/or the direction of the bow of the marine vessel 1 by operating the joystick 7 and/or the lever 10 of the remote controller 6.

Figure 4:
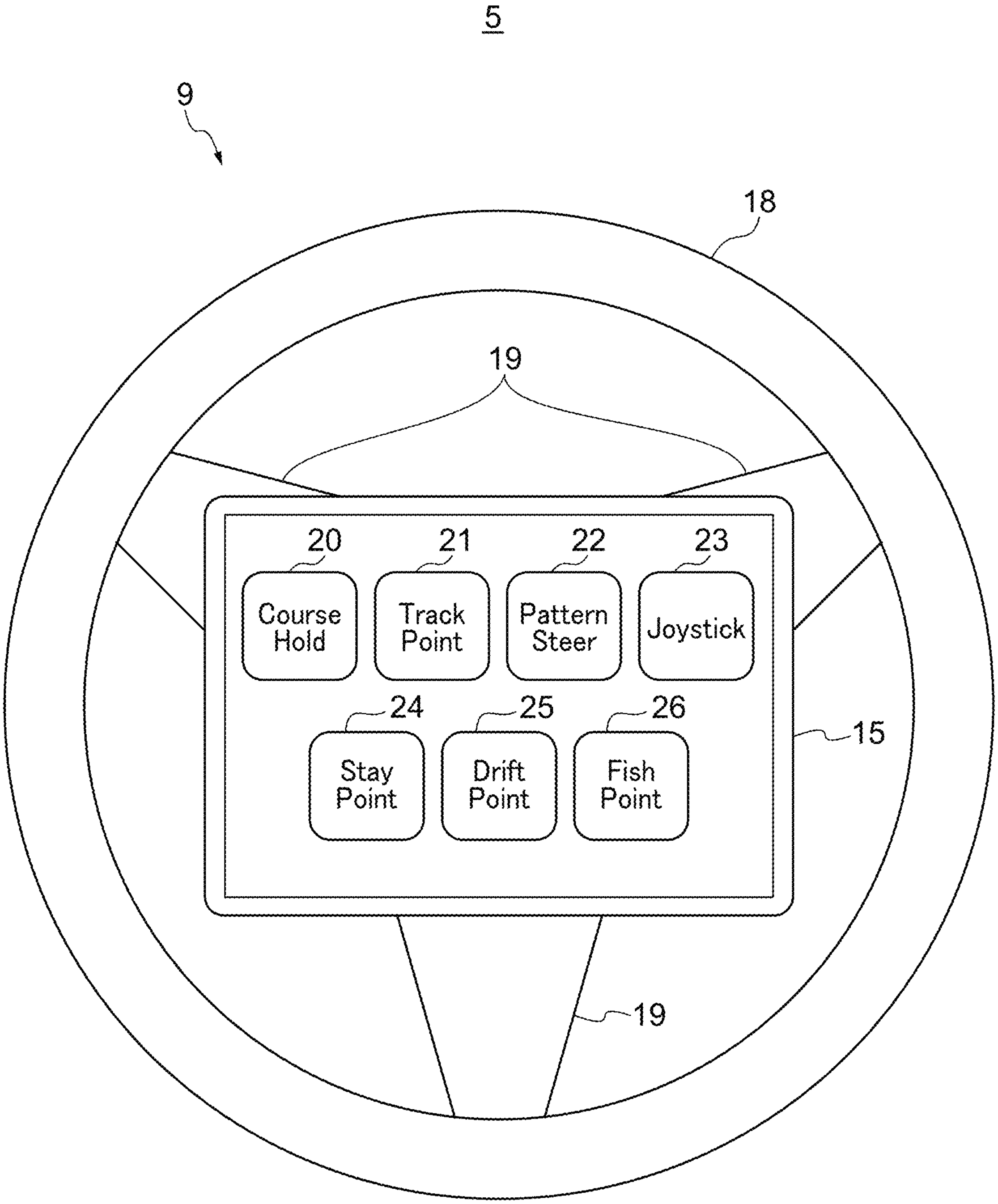
FIG. 4 is a diagram for explaining a configuration of a steering mechanism in the maneuvering system in FIG. 3.

FIG. 4 is a diagram for explaining the configuration of the steering mechanism 5, and illustrates the steering mechanism 5 as viewed from the vessel operator. Note that the vertical direction and the horizontal direction in FIG. 4 coincide with the up-down direction and the left-right direction of the marine vessel 1.

In FIG. 4, the steering mechanism 5 includes a steering wheel 9 and a column portion (not illustrated) that pivotally supports the steering wheel 9 so as to be rotatable about a steering shaft. The steering wheel 9 includes an annular wheel portion 18 and a plurality of (for example, three) spoke portions 19 connecting the column portion and the wheel portion 18.

In the present example embodiment, the maneuvering panel 15 is disposed in or on the steering mechanism 5 (operator). The maneuvering panel 15 is attached to the column portion so that the maneuvering panel 15 does not rotate even when the steering wheel 9 rotates about the steering shaft.

The maneuvering panel 15 includes, for example, an LCD display, functions as a touch panel that receives an input of a vessel operator, and displays touch buttons 20 to 26 (maneuvering function display) as software keys corresponding to each maneuvering mode. When the vessel operator touches any of the touch buttons 20 to 26, an instruction to execute the maneuvering mode corresponding to the touched touch button is transmitted from the maneuvering panel 15 to the BCU 12.

Each maneuvering mode corresponding to each of the touch buttons 20 to 26 will be described below.

A Course Hold button 20 corresponds to a course maintenance mode. The course maintenance mode is a maneuvering mode that is usable while the marine vessel 1 is traveling. The course maintenance mode is a maneuvering mode in which the marine vessel 1 is controlled to maintain a predetermined course while traveling, even in the presence of a tidal stream or wind flow, in consideration of their influence on the marine vessel 1.

A Track Point button 21 corresponds to a track point mode. The track point mode is a maneuvering mode that is usable while the marine vessel 1 is traveling. The track point mode is a mode in which the marine vessel 1 moves along a preset movement route via a plurality of stay points. In order to execute the track point mode, the vessel operator sets a movement route and a plurality of stay points of the marine vessel 1 using the MFD 8 in advance. For example, the vessel operator directly touches a desired point (for example, on a map) displayed on the touch panel of the MFD 8 with a finger or the like, and sets each stay point as a destination from the current stay point. At this time, straight routes connecting the respective stay points are connected to set a movement route.

A Pattern Steer button 22 corresponds to a pattern maneuvering mode. The pattern maneuvering mode is a maneuvering mode that is usable while the marine vessel 1 is traveling. The pattern maneuvering mode is a mode used when a school of fish is searched for using a fish finder after the marine vessel 1 arrives at a stay point where fishing is performed. In the pattern maneuvering mode, the marine vessel 1 moves along a preset movement route based on the current maneuvering location, and a zigzag route or a turning route is set as the movement route at this time.

A Joystick button 23 corresponds to a joystick mode. The joystick mode is a maneuvering mode that is usable while the marine vessel 1 is not traveling. In the joystick mode, the outboard motor 3 operates mainly in accordance with the operation of the joystick 7. The Stay Point™ (registered trademark) corresponds to a Stay Point™ button 24. The Stay Point™ is a maneuvering mode that is usable while the marine vessel 1 is not traveling. In the Stay Point™, the thrust of the outboard motor 3 and the acting direction of the thrust are integrally controlled so as to keep the marine vessel 1 at one point (i.e., a single location) and maintain the azimuth (direction of the bow) of the marine vessel 1 in a specific direction.

A Drift Point™ button 25 corresponds to the Drift Point™ (registered trademark). The Drift Point™ is a maneuvering mode that is usable while the marine vessel 1 is not traveling. In the Drift Point™, the thrust of the outboard motor 3 and the acting direction of the thrust are controlled so as to maintain the direction of the bow of the marine vessel 1 in a specific direction; however, the marine vessel 1 does not stay at one stay point and moves as it is drifted by the wind or water flow. A Fish Point™ button 26 corresponds to the Fish Point™ (registered trademark). The Fish Point™ is a maneuvering mode that is usable while the marine vessel 1 is not traveling. In the Fish Point™, the thrust of the outboard motor 3 and the acting direction of the thrust are controlled such that the marine vessel 1 stays at one stay point, but the direction of the bow of the marine vessel 1 changes due to the tidal stream or the wind flow.

Note that, in order to execute the Stay Point™, the marine vessel 1 needs to move in the lateral direction against the wind and the tidal stream. However, in a case where the marine vessel 1 includes only one outboard motor 3, the marine vessel 1 cannot move in the lateral direction. Therefore, the Stay Point™ involving the lateral movement cannot be executed.

In addition, "traveling" in the present example embodiment indicates a case where the vessel operator intends to move the marine vessel 1 with intention, that is, a case where any lever 10 of the remote controller 6 is moved to the "F" position or the "R" position. "Not traveling" indicates a case where the vessel operator does not intentionally move the marine vessel 1, that is, a case where both the levers 10 of the remote controller 6 are located at the "N" position and each outboard motor 3 of the marine vessel 1 does not generate thrust, or a case where fixed point holding functions such as Stay Point™, Fish Point™, and Drift Point™ are executed.

As described above, the course maintenance mode, the track point mode, and the pattern maneuvering mode are the maneuvering modes (hereinafter, abbreviated as "available modes while traveling") that are usable while the marine vessel 1 is traveling. Therefore, each of the Course Hold button 20, the Track Point button 21, and the Pattern Steer button 22 is a touch button (first maneuvering function display) that displays available modes while traveling. In addition, the maneuvering modes (hereinafter, abbreviated as "available modes while not traveling") that are usable while the marine vessel 1 is not traveling includes the joystick mode, the Stay Point™, the Drift Point™, and the Fish Point™. Thus, each of the Joystick button 23, the Stay Point™ button 24, the Drift Point™ button 25, and the Fish Point™ button 26 is a touch button (second maneuvering function display) that displays the available mode while not traveling.

As described above, since the maneuvering mode that can be used is changed depending on whether the marine vessel 1 is traveling or not, an unavailable maneuvering mode occurs depending on the state of the marine vessel 1. In addition, an unavailable maneuvering mode also occurs in a case where there is only one outboard motor 3 included in the marine vessel 1. At this time, if the touch button corresponding to the unavailable maneuvering mode is continuously displayed or is displayed at a position easily visually recognized by the vessel operator, the vessel operator may erroneously operate the touch button.

Correspondingly, in the present example embodiment, the BCU 12 controls the maneuvering panel 15 based on the configuration of the maneuvering system 11, the maneuvering status of the marine vessel 1, the purpose of use of the marine vessel 1, the current position of the marine vessel 1, and/or the execution record of each maneuvering mode, and switches the display and non-display of each of the touch buttons 20 to 26 or changes the display position of each of the touch buttons 20 to 26. For example, the display position is changed such that the touch button corresponding to the maneuvering mode considered to be frequently used (that is, the possibility of use is high) is displayed at a position where the vessel operator can easily see the touch button and/or at a position where the vessel operator can easily operate the touch button as compared with the touch buttons corresponding to other maneuvering modes.

Figure 5A:
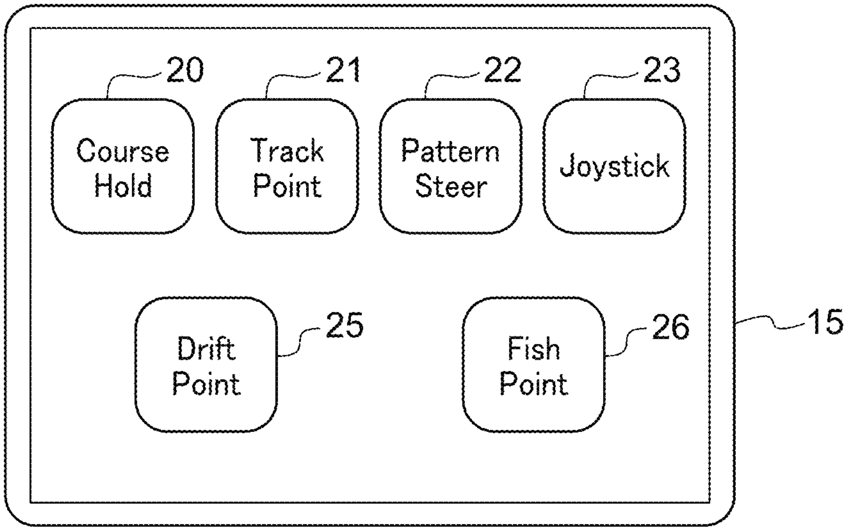
FIGS. 5A to 5C are diagrams for explaining a case of switching between display and non-display of each touch button of a maneuvering panel in the first example embodiment of the present invention.
Figure 5B:
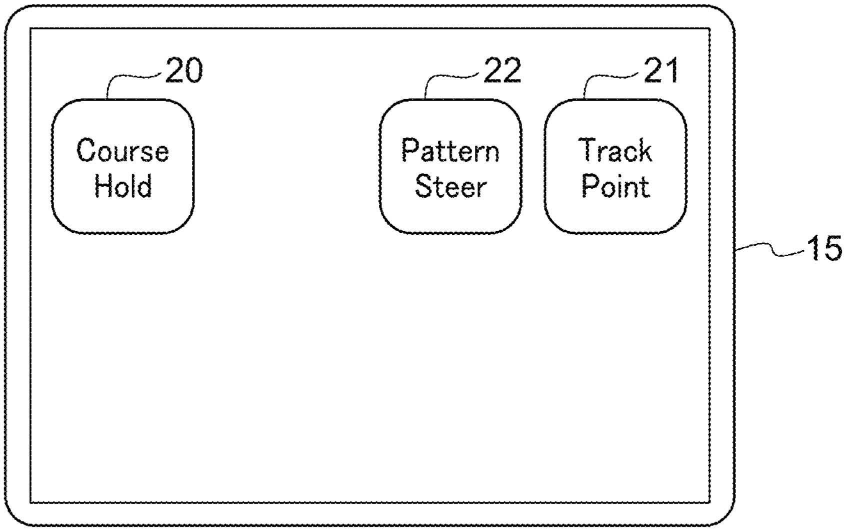
Figure 5C:
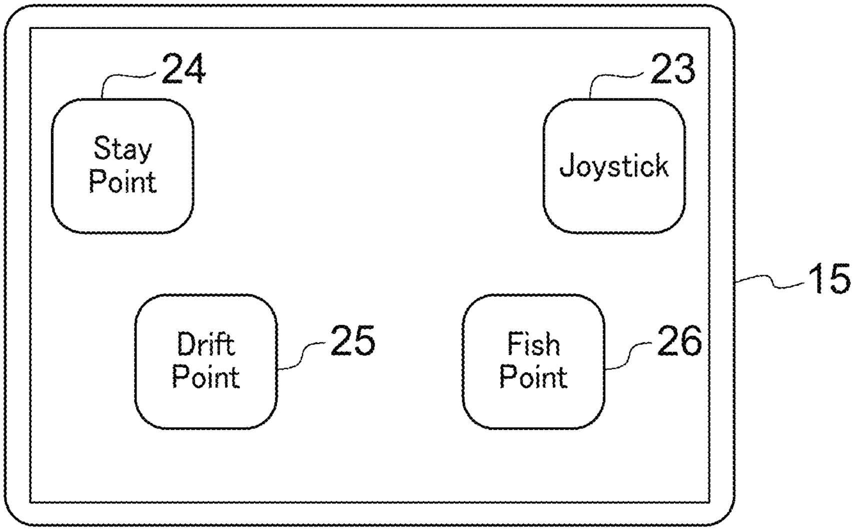

FIGS. 5A to 5C are diagrams for explaining a case of switching between display and non-display of each of the touch buttons 20 to 26 of the maneuvering panel 15. FIGS. 5A to 5C illustrate the maneuvering panel 15, and do not illustrate the steering wheel 9 and the spoke portion 19.

First, in a case where there is only one outboard motor 3 included in the marine vessel 1, the marine vessel 1 cannot move in the lateral direction as described above, and thus the Stay Point™ cannot be executed. Therefore, the BCU 12 does not display the Stay Point™ button 24 on the maneuvering panel 15. In this case, the Drift Point™ button 25 may be moved to a position closer to the hand of the vessel operator who grips the steering wheel 9 to increase the operability by the vessel operator (FIG. 5A).

In addition, in a case where the lever 10 of the remote controller 6 is tilted in the direction of the "F" position, since the marine vessel 1 is traveling, the BCU 12 does not display any of the Joystick button 23, the Stay Point™ button 24, the Drift Point™ button 25, and the Fish Point™ button 26, which are touch buttons to display the available mode while not traveling, on the maneuvering panel 15. In this case, the Track Point button 21 may be moved to a position closer to the hand of the vessel operator who grips the steering wheel 9 to increase the operability by the vessel operator (FIG. 5B).

In addition, in a case where the lever 10 of the remote controller 6 is located at the "N" position, since the marine vessel 1 is not traveling, the BCU 12 does not display any of the Course Hold button 20, the Track Point button 21, and the Pattern Steer button 22, which are touch buttons to display the available modes while traveling, on the maneuvering panel 15. In this case, to increase the operability by the vessel operator, the Stay Point™ button 24, the Drift Point™ button 25, and/or the Fish Point™ button 26 may be moved to a position closer to the hand of the vessel operator gripping the steering wheel 9 (FIG. 5C).

FIGS. 6A to 6D are diagrams for explaining a case where the display position of each of the touch buttons 20 to 26 of the maneuvering panel 15 is changed. FIGS. 6A to 6D also illustrate the maneuvering panel 15, and do not illustrate the steering wheel 9 and the spoke portion 19.

In the marine vessel 1, when the maneuvering system 11 is activated, the BCU 12 may inquire of the vessel operator about the purpose of use of the marine vessel 1 by the MFD 8, for example, whether the marine vessel 1 is mainly used off-shore (in a distant sea region) or in-shore (in a coastal region).

In a case where the vessel operator replies through the input to the MFD 8 that the marine vessel 1 is mainly to be used off-shore, the period of time during which the marine vessel 1 travels becomes longer, and thus, it is considered that the available modes while traveling are mainly used. Therefore, the BCU 12 displays the Course Hold button 20, the Track Point button 21, and the Pattern Steer button 22, which are touch buttons to display the available modes while traveling considered to be frequently used, at positions that are easier for the vessel operator to see than the Joystick button 23, the Stay Point™ button 24, the Drift Point™ button 25, and the Fish Point™ button 26, which are touch buttons to display the available modes while not traveling.

Figure 6A:
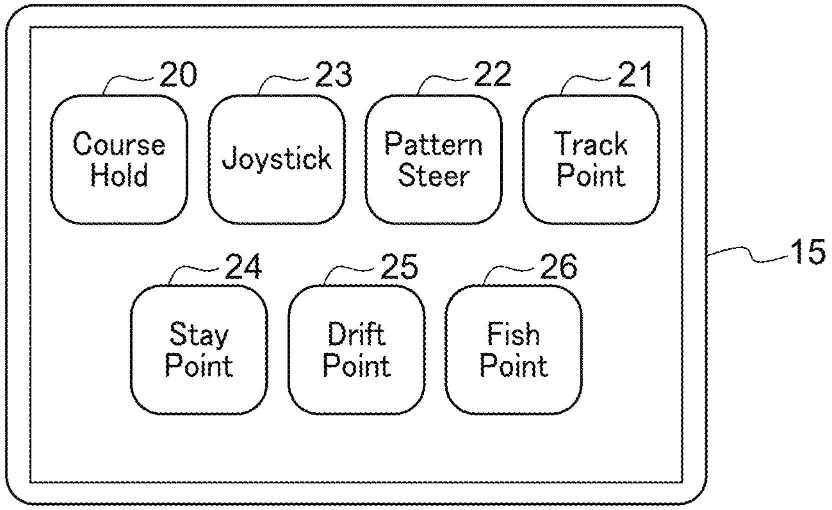
FIGS. 6A to 6D are diagrams for explaining a case where the display position of each touch button of the maneuvering panel is changed in the first example embodiment of the present invention.

Specifically, since the vessel operator who grips the wheel portion 18 of the steering wheel 9 views the maneuvering panel 15 from above, the Course Hold button 20, the Track Point button 21, and the Pattern Steer button 22, which are considered to be frequently used, are displayed above the Joystick button 23, the Stay Point™ button 24, the Drift Point™ button 25, and the Fish Point™ button 26. However, for example, the Joystick button 23 may be displayed on the upper portion of the display of the maneuvering panel 15 depending on the size of the display region of the maneuvering panel 15. In this case, the Track Point button 21 may be moved to a position closer to the hand of the vessel operator who grips the steering wheel 9 to increase the operability by the vessel operator (FIG. 6A).

The touch button located at a position easily seen by the vessel operator may be, for example, a touch button located at a position close to the vessel operator in the display on the maneuvering panel 15 or the like. More specifically, the touch button located at a position easily viewable by the vessel operator viewing the maneuvering panel 15 from above may be a touch button located at a position close to the vessel operator, that is, for example, at an upper position in the display of the maneuvering panel 15 or the like. These descriptions may be similarly applied to each case described below.

Figure 6B:
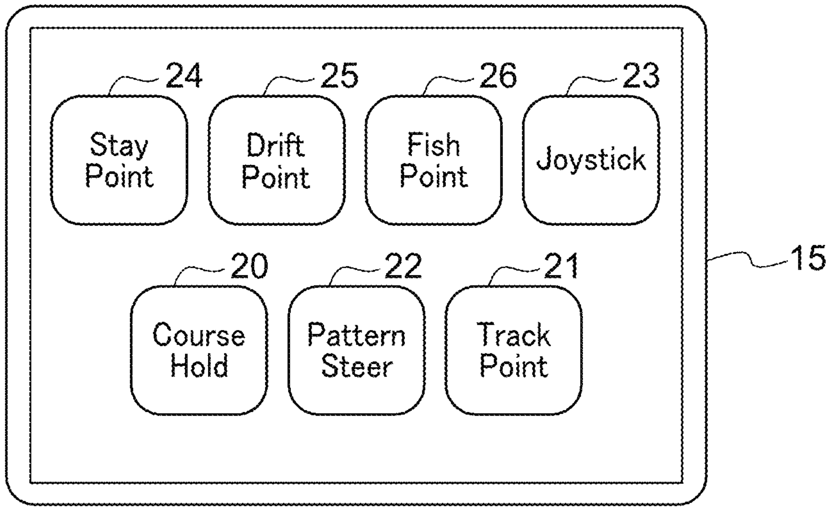

On the other hand, in a case where the vessel operator replies through the input to the MFD 8 that the marine vessel 1 is mainly to be used in-shore, it is considered that the available modes while not traveling are mainly used because the period of time during which the marine vessel 1 is not traveling becomes longer. Therefore, the BCU 12 displays the Joystick button 23, the Stay Point™ button 24, the Drift Point™ button 25, and the Fish Point™ button 26, which are touch buttons to display the available modes while not traveling considered to be frequently used, at positions that are easier for the vessel operator to see than the Course Hold button 20, the Track Point button 21, and the Pattern Steer button 22, which are touch buttons to display the available modes while traveling. Specifically, the Joystick button 23, the Stay Point™ button 24, the Drift Point™ button 25, and the Fish Point™ button 26 are displayed above the Course Hold button 20, the Track Point button 21, and the Pattern Steer button 22 (FIG. 6B).

Furthermore, when the maneuvering system 11 is activated in the marine vessel 1, the BCU 12 may inquire of the vessel operator whether the marine vessel 1 is used for fishing by the MFD 8.

In a case where the vessel operator replies through the input to the MFD 8 that the marine vessel 1 is to be used for fishing, it is considered that the period of time during which the marine vessel 1 is not traveling becomes longer. Therefore, the BCU 12 displays the Joystick button 23, the Stay Point™ button 24, the Drift Point™ button 25, and the Fish Point™ button 26, which are touch buttons to display the available modes while not traveling considered to be frequently used, at positions that are easier for the vessel operator to see than the Course Hold button 20, and the Track Point button 21, which are touch buttons to display the available modes while traveling. Note that the Pattern Steer button 22 is a touch button that displays an available mode while traveling. However, in a case where a vessel operator or a passenger goes fishing, the Pattern Steer button 22 is also displayed at a position that is easier for the vessel operator to see than the Course Hold button 20 and the Track Point button 21 because the pattern maneuvering mode may also be used.

Figure 6C:
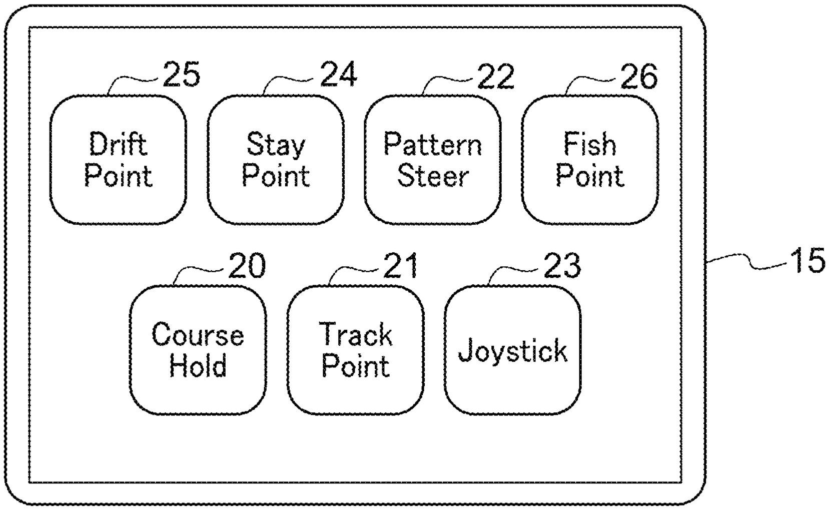

Specifically, the Pattern Steer button 22, the Stay Point™ button 24, the Drift Point™ button 25, and the Fish Point™ button 26 are displayed above the Course Hold button 20 and the Track Point button 21 (FIG. 6C). Note that, in the maneuvering panel 15 illustrated in FIG. 6C, there is no sufficient display region to display the five touch buttons in the upper portion of the display of the maneuvering panel 15, and thus, among the touch buttons corresponding to the available modes while not traveling, the Joystick button 23, which is considered to be less frequently used for fishing, is displayed in the lower portion of the display of the maneuvering panel 15 for convenience.

In addition, when the maneuvering system 11 is activated in the marine vessel 1, the BCU 12 may inquire of the vessel operator whether the marine vessel 1 is used for cruising by the MFD 8. In a case where the vessel operator replies through the input to the MFD 8 that the marine vessel 1 is to be used for cruising, it is considered that the period of time during which the marine vessel 1 is traveling becomes longer. Therefore, the BCU 12 displays the Course Hold button 20, the Track Point button 21, and the Pattern Steer button 22, which are touch buttons to display the available modes while traveling considered to be frequently used, at positions that are easier for the vessel operator to see than the Joystick button 23, the Stay Point™ button 24, the Drift Point™ button 25, and the Fish Point™ button 26, which are touch buttons to display the available modes while not traveling (FIG. 6A).

Figure 6D:
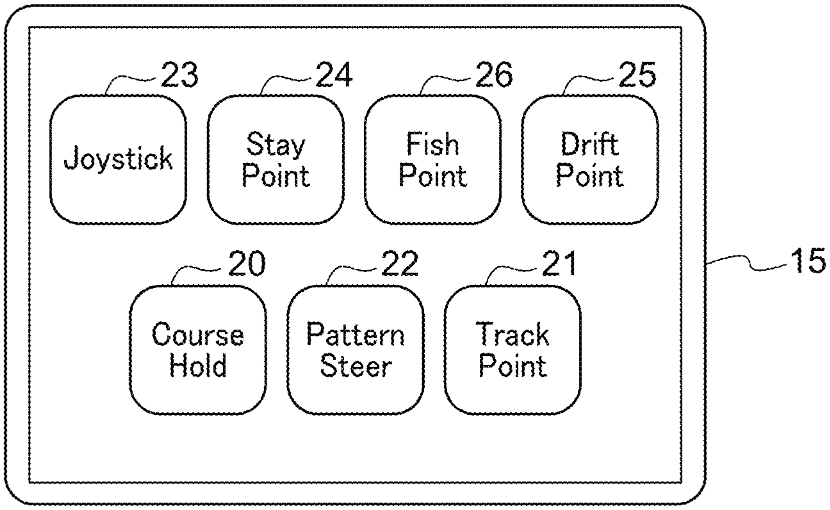

Further, the BCU 12 changes the display position of each of the touch buttons 20 to 26 based on the execution record of each maneuvering mode. For example, in a case where the marine vessel 1 is mainly used in-shore and the execution frequency of the joystick mode, the Stay Point™, the Drift Point™, and the Fish Point™ is higher than the execution frequency of the pattern maneuvering mode, the course maintenance mode, and the track point mode, the Joystick button 23, the Stay Point™ button 24, the Drift Point™ button 25, and the Fish Point™ button 26 are displayed above the Course Hold button 20, the Track Point button 21, and the Pattern Steer button 22 (FIG. 6D).

FIGS. 7A to 7D are diagrams for explaining a case where the display position of each of the touch buttons 20 to 26 of the maneuvering panel 15 is changed. FIGS. 7A to 7D also illustrate the maneuvering panel 15, and do not illustrate the steering wheel 9 and the spoke portion 19.

The BCU 12 changes the display position of each of the touch buttons 20 to 26 based on the maneuvering status of the marine vessel 1 (for example, the maneuvering pattern and the maneuvering time). For example, in a case where the marine vessel 1 is stopped after traveling to the last stay point in the track point mode or in a case where the marine vessel 1 is stopped after cruising for a predetermined period of time, it is considered that there is a high possibility that the vessel operator or the passenger will fish after the marine vessel 1 is stopped.

Figure 7A:
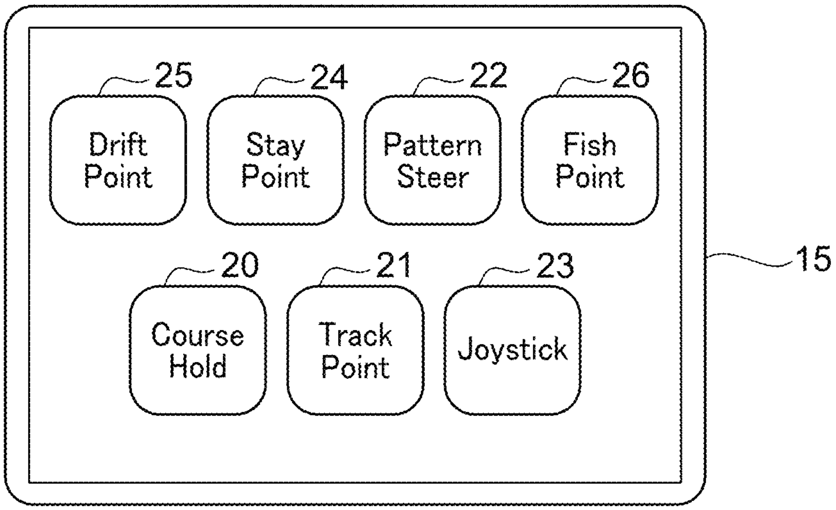
FIGS. 7A to 7D are diagrams for explaining a case where the display position of each touch button of the maneuvering panel is changed in the first example embodiment of the present invention.

Therefore, the BCU 12 displays the Joystick button 23, the Stay Point™ button 24, the Drift Point™ button 25, and the Fish Point™ button 26, which are touch buttons to display the available modes while not traveling considered to be frequently used, at positions that are easier for the vessel operator to see than the Course Hold button 20 and the Track Point button 21, which are touch buttons to display the available modes while traveling. In addition, the Pattern Steer button 22, which displays the pattern maneuvering mode that may be used in a case where the vessel operator or the passenger performs fishing although it is an available mode while traveling, is also displayed at a position that is easier for the vessel operator to see than the Course Hold button 20 and the Track Point button 21 (FIG. 7A). Also in the case of FIG. 7A, similarly to the case of FIG. 6C, the Joystick button 23 which is considered to be used less frequently during fishing is displayed in the lower portion of the display of the maneuvering panel 15 for the sake of convenience due to the size of the display region of the maneuvering panel 15.

In addition, the BCU 12 changes the display position of each of the touch buttons 20 to 26 based on the maneuvering place of the marine vessel 1. For example, in a case where the vessel operator moves the lever 10 of the remote controller 6 to the "N" position after the marine vessel 1 has moved to the vicinity of a pier, for example, the center of gravity of the marine vessel 1 has moved to within 100 m from the pier, it is considered that there is a high possibility that the marine vessel 1 is operated using the joystick 7 in order to dock the marine vessel 1 at the pier.

Figure 7B:
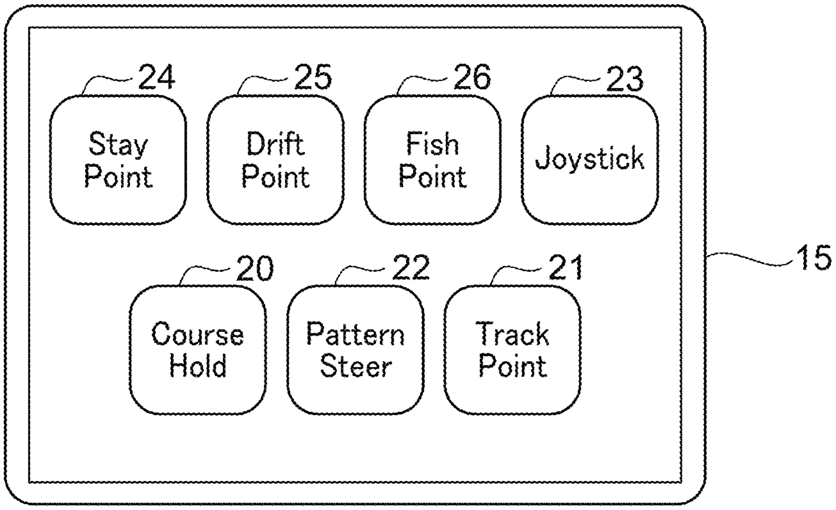

Therefore, the BCU 12 displays the Joystick button 23 at a position where the vessel operator can easily see. In addition, at this time, it is considered that there is a higher possibility of using an available mode while not traveling than an available mode while traveling. Thus, in addition to the Joystick button 23, the BCU 12 displays the Stay Point™ button 24, the Drift Point™ button 25, and the Fish Point™ button 26, which are touch buttons to display the available modes while not traveling considered to be frequently used, at positions that are easier for the vessel operator to see than the Course Hold button 20, the Track Point button 21, and the Pattern Steer button 22, which are touch buttons to display the available modes while traveling (FIG. 7B).

Further, the switch 17 receives an instruction to turn on or start each outboard motor 3. Since there is a high possibility that the vessel operator moves the marine vessel 1 from the pier using the joystick 7 until a predetermined period of time elapses after the outboard motor 3 is powered on or started, the BCU 12 displays the Joystick button 23 at a position where the vessel operator can easily see (FIG. 7B).

Figure 7C:
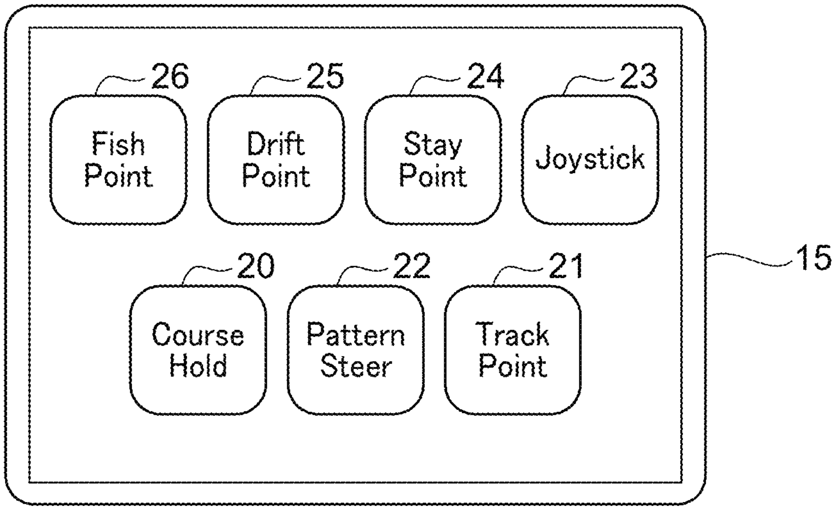

In addition, the BCU 12 changes the display position of each of the touch buttons 20 to 26 based on the execution record of each maneuvering mode and/or the maneuvering status when each maneuvering mode is executed. For example, it is assumed that a specific maneuvering mode (for example, joystick mode, Stay Point, Drift Point, or Fish Point™) is often executed after the marine vessel 1 moves to the last stay point and stops in the track point mode or after the marine vessel 1 cruises for a predetermined period of time and stops. Following this, after the marine vessel 1 moves to the last stay point in the track point mode again and stops or the marine vessel 1 cruises for a predetermined period of time and stops again, the BCU 12 displays the Joystick button 23, the Stay Point™ button 24, the Drift Point™ button 25, and the Fish Point™ button 26 at positions easier for the vessel operator to see than the Pattern Steer button 22, the Course Hold button 20, and the Track Point button 21 (FIG. 7C).

Figure 7D:
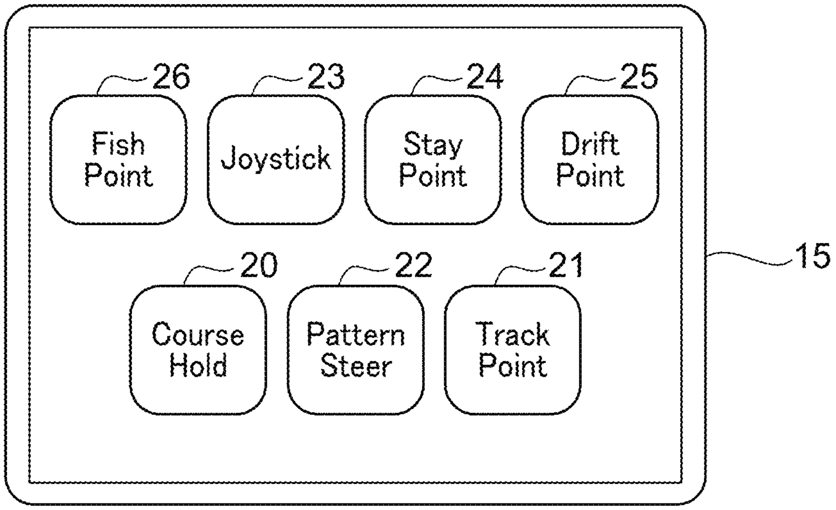

In addition, the BCU 12 changes the display position of each of the touch buttons 20 to 26 based on the execution record of each maneuvering mode and/or the place where each maneuvering mode is executed. For example, it is assumed that the marine vessel 1 often executes the Drift Point™ in order to fish in a specific sea region where a tidal stream flows. To cope with this, after the case where the marine vessel 1 has moved to the specific sea region occurs again, the BCU 12 displays the Drift Point™ button 25 at a position where the vessel operator can easily see it. At this time, it is considered that the possibility of using an available mode while not traveling is higher than an available mode while traveling. Therefore, in addition to the Drift Point™ button 25, the Joystick button 23, the Stay Point™ button 24, and the Fish Point™ button 26 are also displayed at positions easier for the vessel operator to see than the Course Hold button 20, the Track Point button 21, and the Pattern Steer button 22 (FIG. 7D).

According to the present example embodiment, the display and non-display of each of the touch buttons 20 to 26 or the display position of each of the touch buttons 20 to 26 is switched in the maneuvering panel 15 based on the configuration of the maneuvering system 11, the maneuvering status of the marine vessel 1, the purpose of use of the marine vessel 1, the current position of the marine vessel 1, and/or the execution record of each maneuvering mode. Specifically, the touch button corresponding to an unavailable maneuvering mode is not displayed, or the touch button corresponding to a maneuvering mode considered to be frequently used is displayed at a position where the vessel operator can easily see the touch button. As a result, it is possible to reduce the possibility that the vessel operator erroneously operates the touch button corresponding to an unavailable maneuvering mode or the touch button corresponding to a maneuvering mode considered to be less frequently used. As a result, the usability of each of the touch buttons 20 to 26 can be improved.

In addition, in the present example embodiment, display and non-display of each of the touch buttons 20 to 26 displayed on the maneuvering panel 15 are only switched, or the display position is only changed. Therefore, it is not necessary to prepare a plurality of arrangement patterns of physical switches according to the configuration of the maneuvering system 11, the maneuvering status of the marine vessel 1, the purpose of use of the marine vessel 1, the current position of the marine vessel 1, and/or the execution record of each maneuvering mode. That is, it is not necessary to prepare an operation panel or the like in which a plurality of physical switches are arranged, which is also advantageous in terms of cost.

In the present example embodiment, the Course Hold button 20, the Track Point button 21, the Pattern Steer button 22, the Joystick button 23, the Stay Point™ button 24, the Drift Point™ button 25, and the Fish Point™ button 26 are displayed on the maneuvering panel 15. However, the touch buttons displayed on the maneuvering panel 15 are not limited thereto, and touch buttons corresponding to other maneuvering modes may be displayed.

Figure 8A:
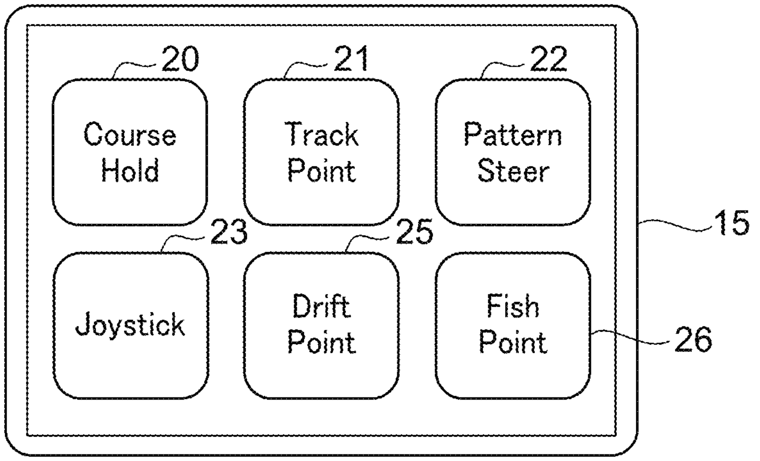
FIGS. 8A to 8C are diagrams for explaining a case where the display of each touch button of the maneuvering panel is changed according to a variation of the first example embodiment of the present invention.

In the present example embodiment, display and non-display of each of the touch buttons 20 to 26 are switched. However, in addition to or instead of this, the size of each of the touch buttons 20 to 26 may be changed. For example, in a case where there is only one outboard motor 3 included in the marine vessel 1, the display region of the maneuvering panel 15 has a margin because the Stay Point™ button 24 is not displayed on the maneuvering panel 15. Therefore, the Course Hold button 20, the Track Point button 21, the Pattern Steer button 22, the Joystick button 23, the Drift Point™ button 25, and the Fish Point™ button 26 may be displayed in an enlarged manner by taking advantage of the margin (FIG. 8A). This provides the vessel operator with favorable visibility and operability of the touch buttons 20 to 23, 25, and 26.

Figure 8B:
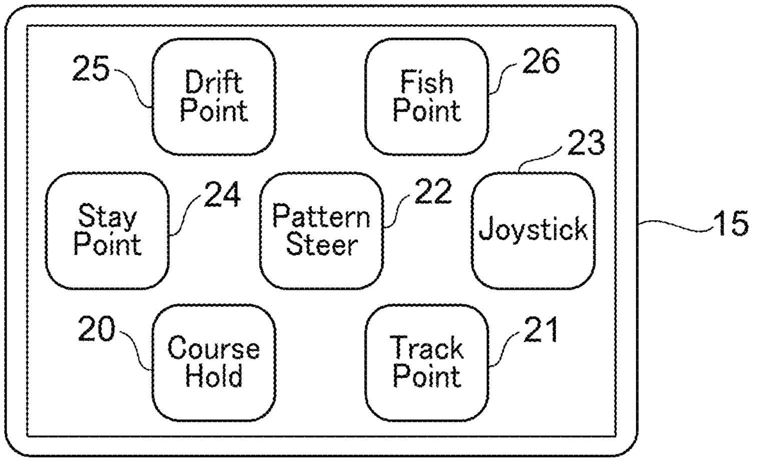

Further, in the present example embodiment, the display positions of the touch buttons 20 to 26 are changed by switching the display positions of the touch buttons 20 to 26 as illustrated in FIGS. 6A to 6D and FIGS. 7A to 7D. However, the display position of each of the touch buttons 20 to 26 may be changed by moving each of the touch buttons 20 to 26 to a position where each of the touch buttons 20 to 26 has not been displayed. For example, in a case where the vessel operator replies through the input to the MFD 8 that the marine vessel 1 is mainly to be used in-shore, the Joystick button 23, the Stay Point™ button 24, the Drift Point™ button 25, and the Fish Point™ button 26 may be moved to positions where the touch buttons are not displayed (from the respective positions shown in FIG. 6B) to generate a margin in the upper portion of the display region of the maneuvering panel 15. At this time, even in an available mode while traveling, the Pattern Steer button 22 to display the pattern maneuvering mode which is assumed to be used in-shore may be displayed above the Course Hold button 20 and the Track Point button 21 (FIG. 8B).

Figure 8C:
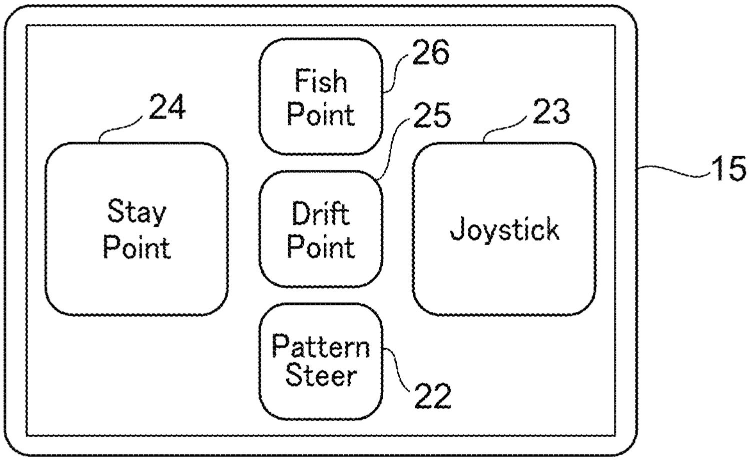

Further, the size of each of the touch buttons 20 to 26 may be changed as well as each of the touch buttons 20 to 26 may be moved to a position where each of the touch buttons 20 to 26 is not displayed. For example, in a case where the vessel operator replies through the input to the MFD 8 that the marine vessel 1 is mainly to be used in-shore, it is considered that the Course Hold button 20 and the Track Point button 21 are not used, and the Stay Point™ button 24 and the Joystick button 23 become to be used more frequently. Therefore, in this case, the Course Hold button 20 and/or the Track Point button 21 may not be displayed, and furthermore, the Pattern Steer button 22, the Drift Point™ button 25, and the Fish Point™ button 26 may be moved to positions where the respective touch buttons are not displayed (from the respective positions shown in FIG. 6B) to have a margin for a display region on the maneuvering panel 15. Further, the Stay Point™ button 24 and the Joystick button 23, which are considered to be frequently used, may be enlarged and displayed by taking advantage of the margin of the display region (FIG. 8C). As a result, the visibility and operability of the Stay Point™ button 24 and the Joystick button 23 can be improved. Note that switching between display and non-display of each of the touch buttons 20 to 26 and changing the display position of each of the touch buttons 20 to 26 are not limited to the cases illustrated in FIGS. 5A to 8C.

Figure 9:
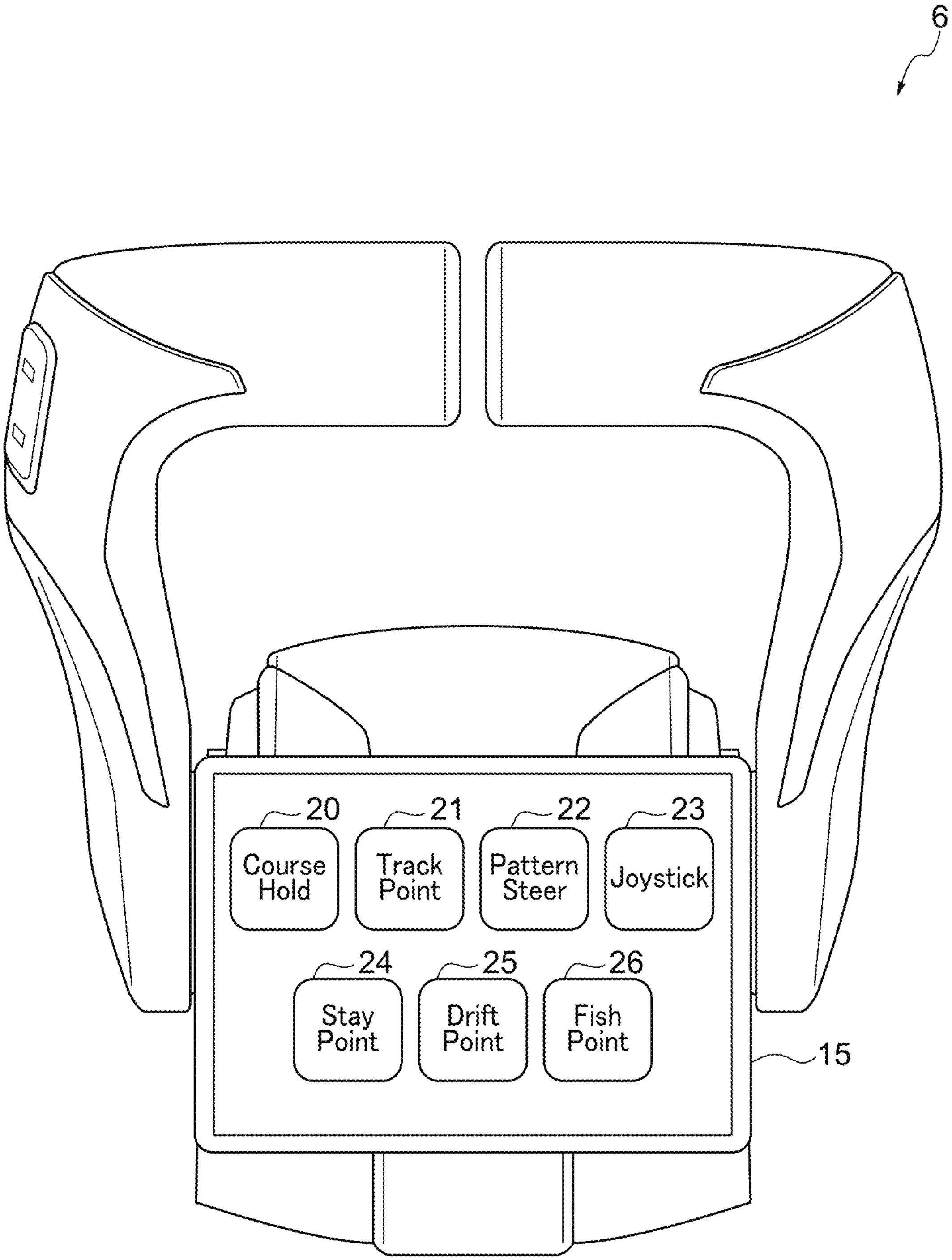
FIG. 9 is a diagram illustrating a case where a maneuvering panel is disposed on a remote controller.
Figure 10:
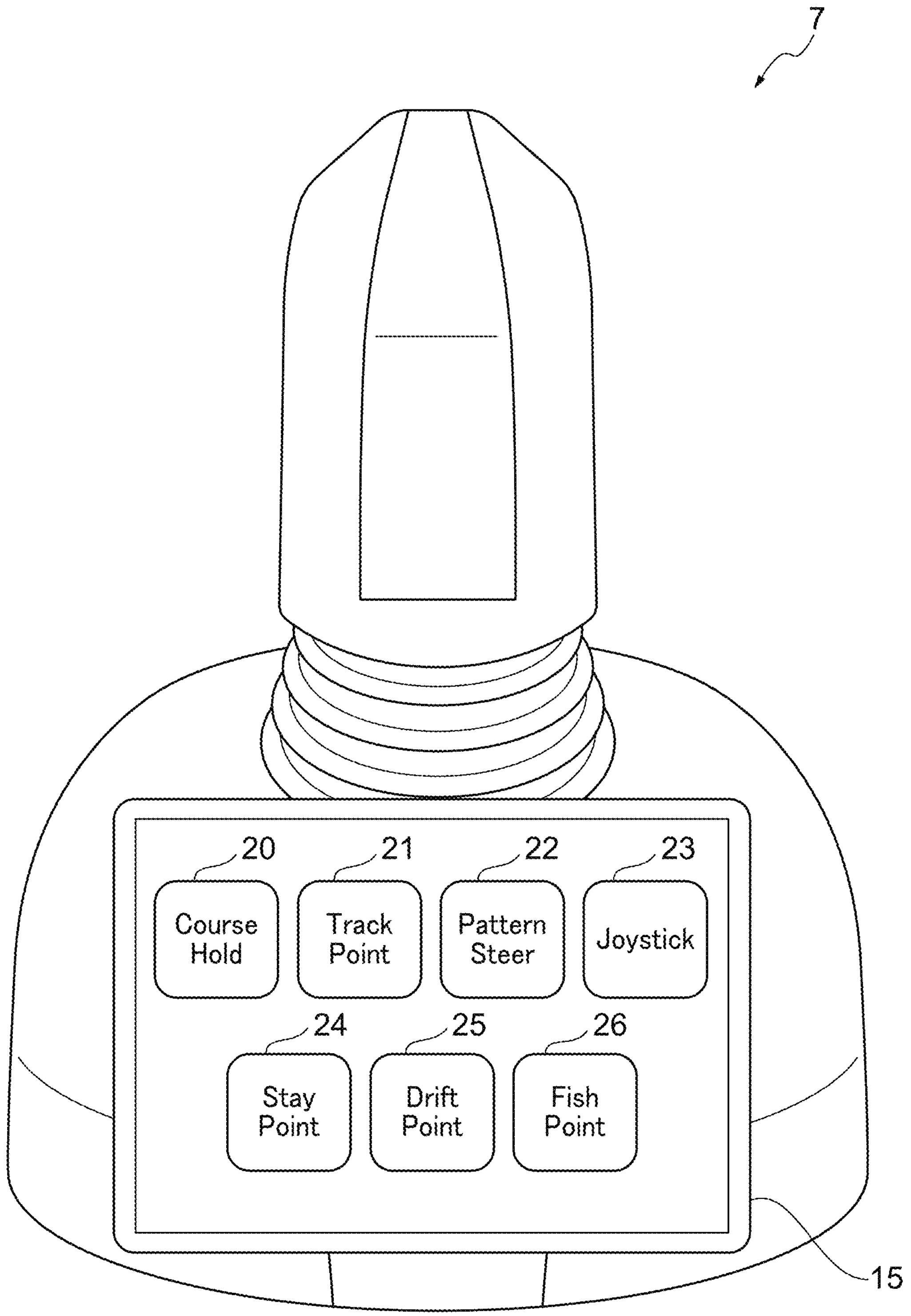
FIG. 10 is a diagram illustrating a case where a maneuvering panel is disposed on a joystick.
Figure 11:
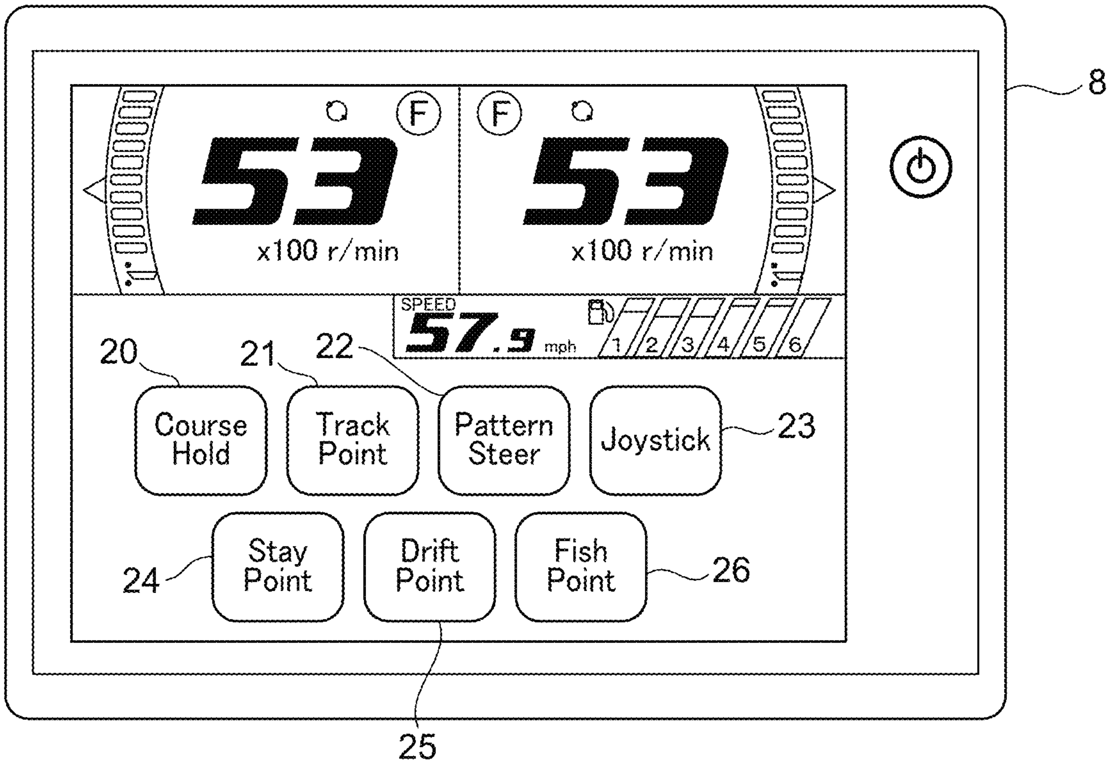
FIG. 11 is a diagram illustrating a case where a partial region of a touch panel of the MFD functions as a maneuvering panel.

Further, in the present example embodiment, the maneuvering panel 15 is disposed in the steering mechanism 5. However, as illustrated in FIG. 9, the maneuvering panel 15 may be disposed in the remote controller 6 (operator). Alternatively, as illustrated in FIG. 10, the maneuvering panel 15 may be disposed on the joystick 7 (operator). Alternatively, as illustrated in FIG. 11, a partial region of the touch panel of the MED 8 may function as a maneuvering panel, and the Course Hold button 20, the Track Point button 21, the Pattern Steer button 22, the Joystick button 23, the Stay Point™ button 24, the Drift Point™ button 25, and the Fish Point™ button 26 may be displayed in the area. In this case, the maneuvering system 11 may not include the maneuvering panel 15.

Note that, also in the case of adopting the configurations illustrated in FIGS. 9 to 11, the display and non-display of each of the touch buttons 20 to 26 or the display position of each of the touch buttons 20 to 26 is switched based on the configuration of the maneuvering system 11, the maneuvering status of the marine vessel 1, the purpose of use of the marine vessel 1, the current position of the marine vessel 1, and/or the execution record of each maneuvering mode.

Next, a second example embodiment of the present invention will be described. Since the second example embodiment is different from the first example embodiment only in the maneuvering panel, the overlapping configurations and operations will not be described. Hereinafter, configurations and effects different from those of the first example embodiment will be described.

Figure 12:
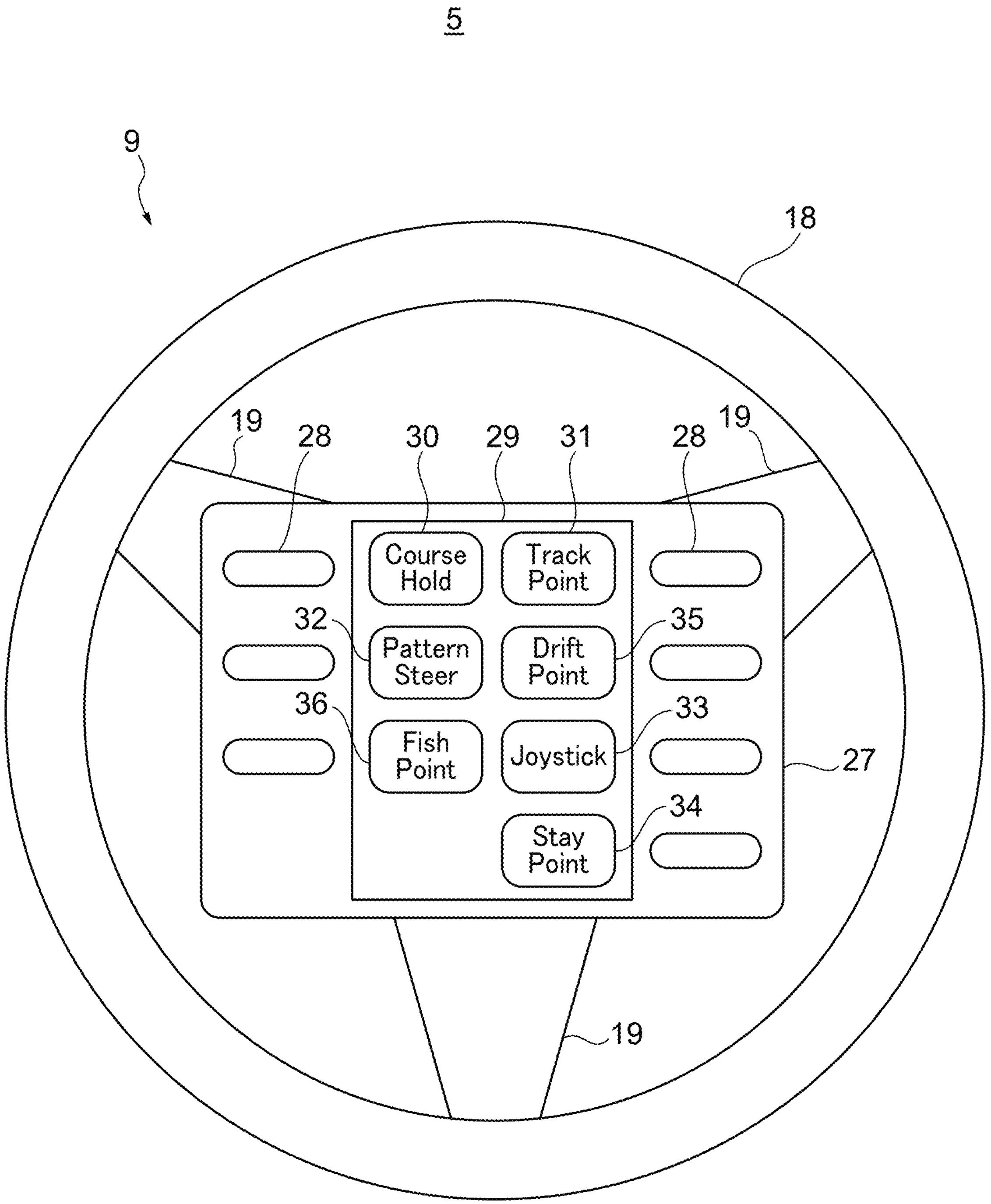
FIG. 12 is a diagram for explaining a configuration of a steering mechanism in a maneuvering system according to a second example embodiment of the present invention.

FIG. 12 is a diagram for explaining the configuration of the steering mechanism 5 in the present example embodiment, and FIG. 12 illustrates the steering mechanism 5 as viewed from the vessel operator. Note that the vertical direction and the horizontal direction in FIG. 12 coincide with the up-down direction and the left-right direction of the marine vessel 1.

In FIG. 12, the steering mechanism 5 includes a maneuvering panel 27 instead of the maneuvering panel 15. Similarly to the maneuvering panel 15, the maneuvering panel 27 is attached to the column portion so that the maneuvering panel 27 does not rotate even when the steering wheel 9 rotates about the steering shaft.

The maneuvering panel 27 is a horizontally long rectangular panel, and includes a plurality of push buttons 28 arranged side by side in the vertical direction in a left side portion and a right side portion in the maneuvering panel 27. Each push button 28 is a physical switch for the vessel operator to perform an input operation by pushing down with a finger. In addition, the maneuvering panel 27 includes a display 29 at the center thereof. The display 29 includes, for example, an LCD display, and displays a plurality of function display icons 30 to 36 (maneuvering function display) so as to be adjacent to and correspond to the respective push buttons 28.

The function display icons 30 to 36 include a character string indicating a maneuvering mode executed when each adjacent push button 28 is pressed down. For example, a Course Hold icon 30 corresponds to the course maintenance mode, and when the push button 28 adjacent to the Course Hold icon 30 is pressed down, an instruction to execute the course maintenance mode is transmitted from the maneuvering panel 27 to the BCU 12. A Track Point icon 31 corresponds to a track point mode, and when the push button 28 adjacent to the Track Point icon 31 is pressed down, an instruction to execute the track point mode is transmitted from the maneuvering panel 27 to the BCU 12. A Pattern Steer icon 32 corresponds to a pattern maneuvering mode, and when the push button 28 adjacent to the Pattern Steer icon 32 is pressed down, an instruction to execute the pattern maneuvering mode is transmitted from the maneuvering panel 27 to the BCU 12.

In addition, a Joystick icon 33 corresponds to the joystick mode, and when the push button 28 adjacent to the Joystick icon 33 is pressed down, an instruction to execute the joystick mode is transmitted from the maneuvering panel 27 to the BCU 12. A Stay Point™ icon 34 corresponds to the stay point, and when the push button 28 adjacent to the Stay Point™ icon 34 is pressed down, an instruction to execute the stay point is transmitted from the maneuvering panel 27 to the BCU 12. A Drift Point™ icon 35 corresponds to the drift point, and when the push button 28 adjacent to the Drift Point™ icon 35 is pressed down, an instruction to execute the Drift Point™ is transmitted from the maneuvering panel 27 to the BCU 12. A Fish Point™ icon 36 corresponds to the Fish Point™, and when the push button 28 adjacent to the Fish Point™ icon 36 is pressed down, an instruction to execute the Fish Point™ is transmitted from the maneuvering panel 27 to the BCU 12.

The display position of the function display icons 30 to 36 on the display 29 can be changed. As the display positions of the function display icons 30 to 36 are changed, the correspondence between the push button 28 and the maneuvering mode to be executed is also changed. For example, the Fish Point™ icon 36 may move from next to the push button 28 at the lowermost on the left side to next to the push button 28 at the uppermost on the right side. In this case, before the movement of the Fish Point™ icon 36, the Fish Point™ is executed when the push button 28 at the lowermost on the left side is pressed down, but after the movement of the Fish Point™ icon 36, the Fish Point™ is not executed even when the push button 28 at the lowermost on the left side is pressed down. Instead, after the movement of the Fish Point™ icon 36, when the push button 28 at the lowermost on the left side is pushed down, the maneuvering mode indicated by the function display icon adjacent to the pushed push button 28 at the lowermost on the left side at that time is executed. After the movement of the Fish Point™ icon 36, the push button 28 at the uppermost on the right side is pressed down to execute the Fish Point™.

In the present example embodiment, the Course Hold icon 30, the Track Point icon 31, and the Pattern Steer icon 32 are function display icons (first maneuvering function display) indicating available modes while traveling. The Joystick icon 33, the Stay Point™ icon 34, the Drift Point™ icon 35, and the Fish Point™ icon 36 are function display icons (second maneuvering function display) indicating the available modes while not traveling.

In addition, in the present example embodiment, the BCU 12 controls the display 29 of the maneuvering panel 27 based on the configuration of the maneuvering system 11, the maneuvering status of the marine vessel 1, the purpose of use of the marine vessel 1, the current position of the marine vessel 1, and/or the execution record of each maneuvering mode, and switches the display and non-display of each of the function display icons 30 to 36 or changes the display position of each of the function display icons 30 to 36.

FIGS. 13A to 13D are diagrams for explaining a case of switching between display and non-display of each of the function display icons 30 to 36 of the maneuvering panel 27 and changing the display position of each of the function display icons 30 to 36. Note that switching between display and non-display of each of the function display icons 30 to 36 and changing the display position of each of the function display icons 30 to 36 are not limited to the cases illustrated in FIGS. 13A to 13D.

Figure 13A:
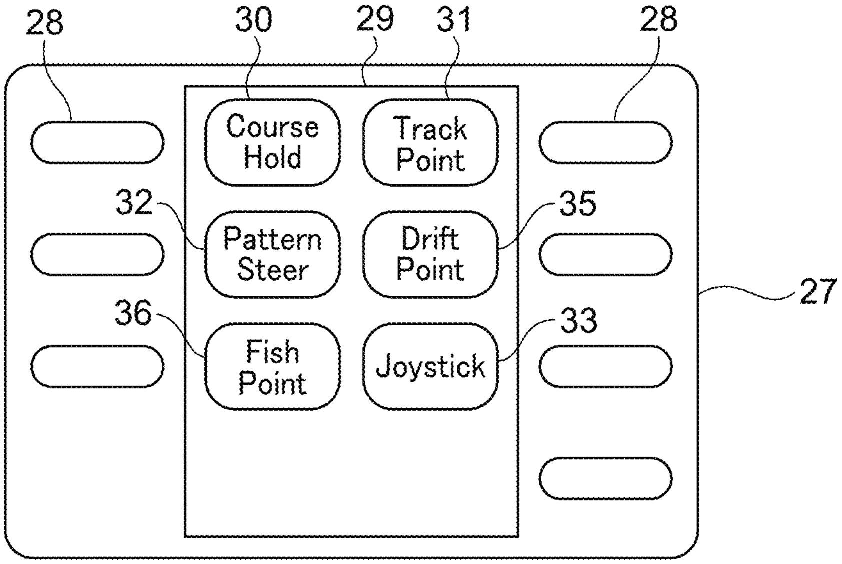
FIGS. 13A to 13D are diagrams for explaining a case where display and non-display of the function display icons of the maneuvering panel are switched and the display positions of the function display icons are changed in the second example embodiment of the present invention.
Figure 13B:
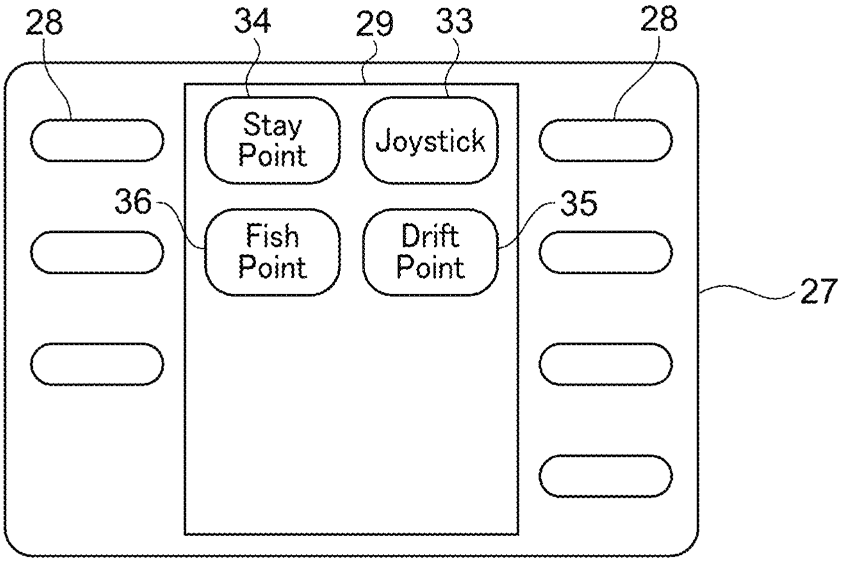

For example, in a case where the marine vessel 1 includes only one outboard motor 3, the BCU 12 does not display the Stay Point™ icon 34 on the display 29 (FIG. 13A). Further, in a case where the lever 10 of the remote controller 6 is located at the "N" position, the BCU 12 does not display any of the Course Hold icon 30, the Track Point icon 31, and the Pattern Steer icon 32, which are function display icons to display available modes while traveling, on the display 29. In this case, the Joystick icon 33, the Stay Point™ icon 34, and/or the Fish Point™ icon 36 may be moved upward to increase the visibility by the vessel operator (FIG. 13B).

Figure 13C:
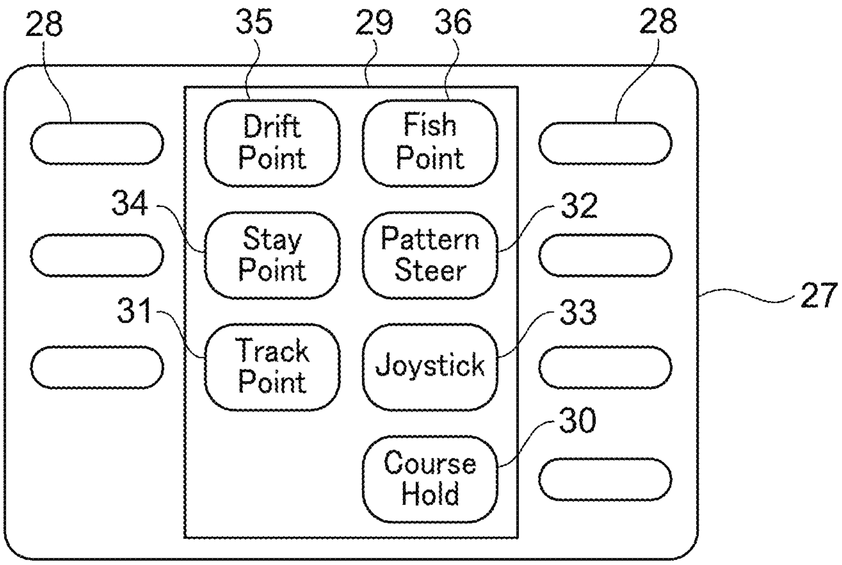

Further, in a case where the vessel operator replies through the input to the MFD 8 that the marine vessel 1 is to be used for fishing, the Stay Point™ icon 34, the Drift Point™ icon 35, and the Fish Point™ icon 36, which are function display icons to display the available modes while not traveling, and the Pattern Steer icon 32 to display the pattern maneuvering mode that may be used for fishing even in an available mode while traveling, are displayed above the Course Hold icon 30 and the Track Point icon 31 (FIG. 13C). Note that, in the maneuvering panel 27 illustrated in FIG. 13C, due to the size of the display region of the display 29, among the function display icons in the available modes while not traveling, the Joystick icon 33, which is considered to be less frequently used during fishing, is displayed below the display of the display 29 for the sake of convenience.

Figure 13D:
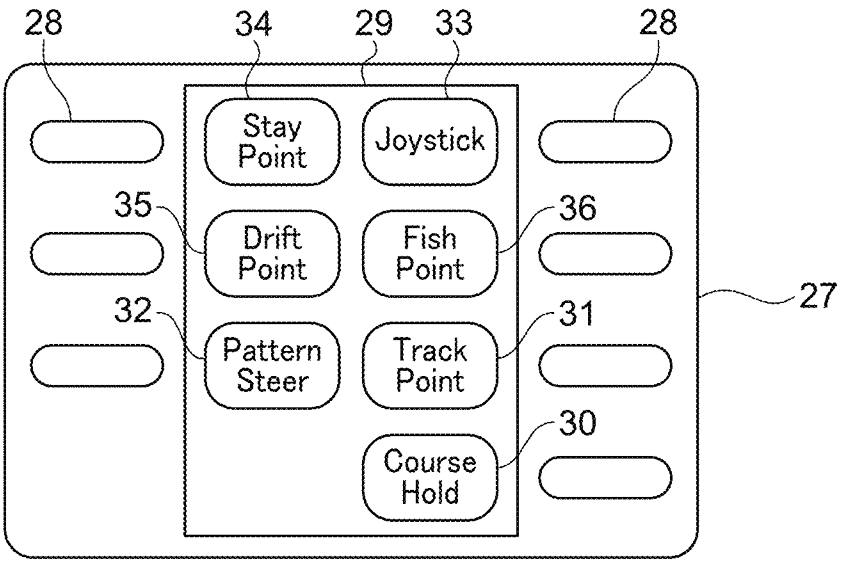

In addition, in a case where the vessel operator moves the lever 10 of the remote controller 6 to the "N" position after the marine vessel 1 has moved to the vicinity of a pier, for example, the center of gravity of the marine vessel 1 has become within 100 m from the pier, the BCU 12 displays the Joystick icon 33 at the uppermost position, which is an easily viewable position for the vessel operator. In addition, at this time, it is considered that there is a higher possibility of using an available mode while not traveling than an available mode while traveling. Therefore, in addition to the Joystick icon 33, the BCU 12 displays the Stay Point™ icon 34, the Drift Point™ icon 35, and the Fish Point™ icon 36 above the Course Hold icon 30, the Track Point icon 31, and the Pattern Steer icon 32 (FIG. 13D).

According to the present example embodiment, the display and non-display of each of the function display icons 30 to 36 or the display position of each of the function display icons 30 to 36 is switched in the maneuvering panel 27 based on the configuration of the maneuvering system 11, the maneuvering status of the marine vessel 1, the purpose of use of the marine vessel 1, the current position of the marine vessel 1, and/or the execution record of each maneuvering mode. Specifically, the function display icons corresponding to unavailable maneuvering modes are not displayed, or function display icons corresponding to maneuvering modes considered to be frequently used is displayed at a position where the vessel operator can easily see the function display icon. Accordingly, it is possible to reduce the possibility that the vessel operator erroneously operates the push button 28 adjacent to the function display icon corresponding to the unavailable maneuvering mode or the push button 28 adjacent to the function display icon corresponding to the maneuvering mode considered to be less frequently used. As a result, usability of the maneuvering panel 27 can be improved.

In the present example embodiment, each of the function display icons 30 to 36 includes a character string indicating the corresponding maneuvering mode. However, each of the function display icons 30 to 36 may not include a character string, and may be configured by an illustration indicating a corresponding maneuvering mode. In the present example embodiment, the maneuvering panel 27 is disposed in the steering mechanism 5. However, the maneuvering panel 27 may be disposed on the remote controller 6 or may be disposed on the joystick 7.

Figure 14A:
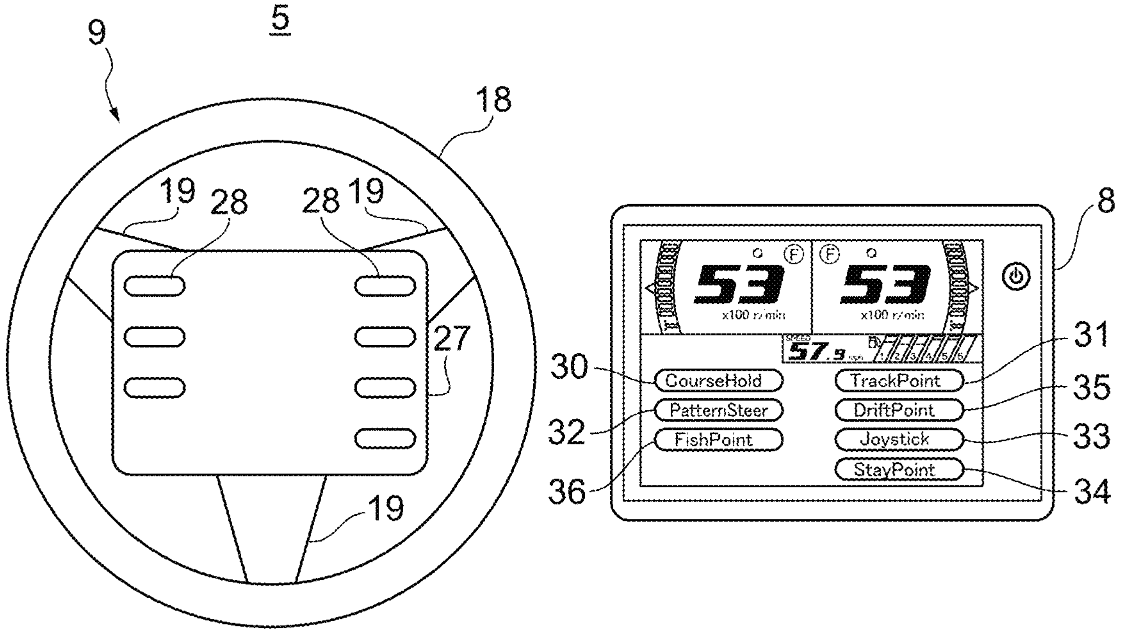
FIGS. 14A and 14B are diagrams for explaining a case where each push button and each function display icon are separately arranged.
Figure 14B:
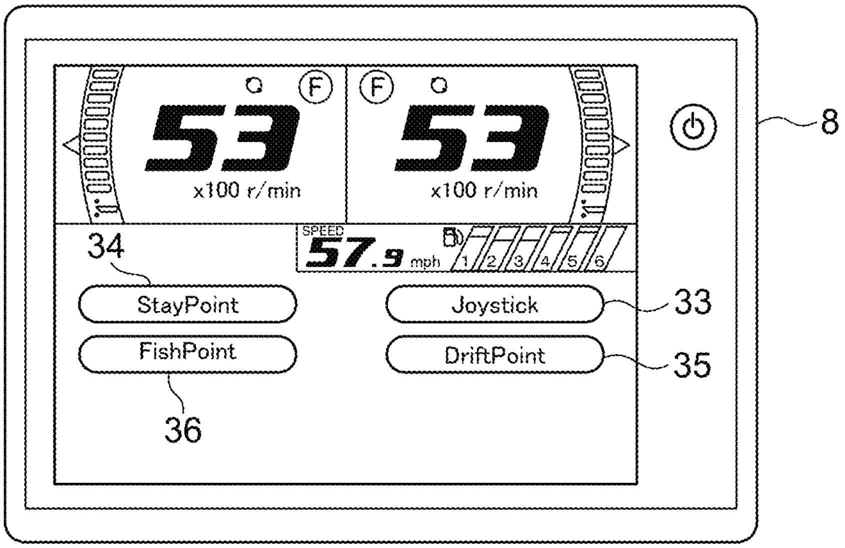

Further, the push buttons 28 and the function display icons 30 to 36 may be arranged separately. FIGS. 14A and 14B are diagrams for explaining a case where the push buttons 28 and the function display icons 30 to 36 are separately arranged. For example, as illustrated in FIG. 14A, the maneuvering panel 27 disposed in the steering mechanism 5 does not include the display 29, and each of the function display icons 30 to 36 is displayed on the touch panel of the MFD 8. In the region where the function display icons 30 to 36 are displayed, the arrangement of the function display icons 30 to 36 corresponds to that of the push buttons 28 on the maneuvering panel 27. When a certain push button 28 of the maneuvering panel 27 is pushed down, a maneuvering mode indicated by a function display icon displayed on the touch panel of the MED 8 and having a position corresponding to the pushed push button 28 is executed.

The display positions of the function display icons 30 to 36 on the touch panel of the MFD 8 can be changed. When the display positions of the function display icons 30 to 36 are changed, the maneuvering mode executed when a certain push button 28 is pushed down is also changed. Specifically, the maneuvering mode executed by pressing a certain push button 28 is changed from the maneuvering mode indicated by the function display icon whose position corresponds to the position of the push button 28 before the display position is changed to the maneuvering mode indicated by the function display icon whose position corresponds to the position of the push button 28 after the change.

In this manner, even in a case where the push buttons 28 and the function display icons 30 to 36 are separately arranged, the BCU 12 controls the touch panel of the MFD 8 to switch between display and non-display of the function display icons 30 to 36 or change the display positions of the function display icons 30 to 36 based on the configuration of the maneuvering system 11, the maneuvering status of the marine vessel 1, the purpose of use of the marine vessel 1, the current position of the marine vessel 1, and/or the execution record of each maneuvering mode.

For example, in a case where the lever 10 of the remote controller 6 is located at the "N" position, the BCU 12 displays none of the Pattern Steer icon 32, the Course Hold icon 30, and the Track Point icon 31 on the touch panel of the MFD 8. In this case, the Joystick icon 33, the Stay Point™ icon 34, and/or the Fish Point™ icon 36 may be moved upward to increase the visibility by the vessel operator (FIG. 14B).

Figure 15A:
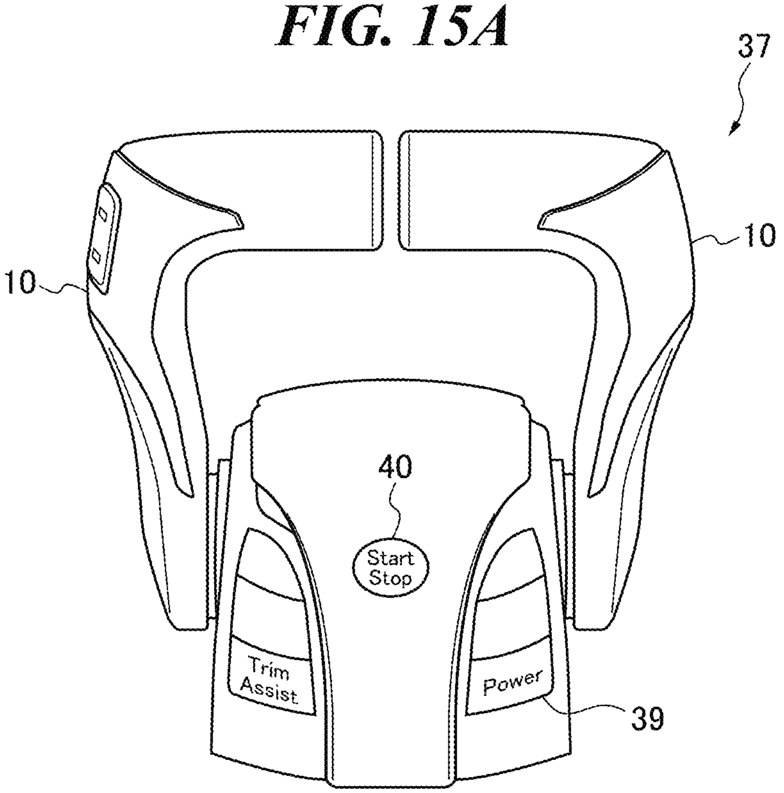
FIG. 15A is a diagram for explaining a configuration of a remote controller in a maneuvering system according to a third example embodiment of the present invention.
Figure 15B:
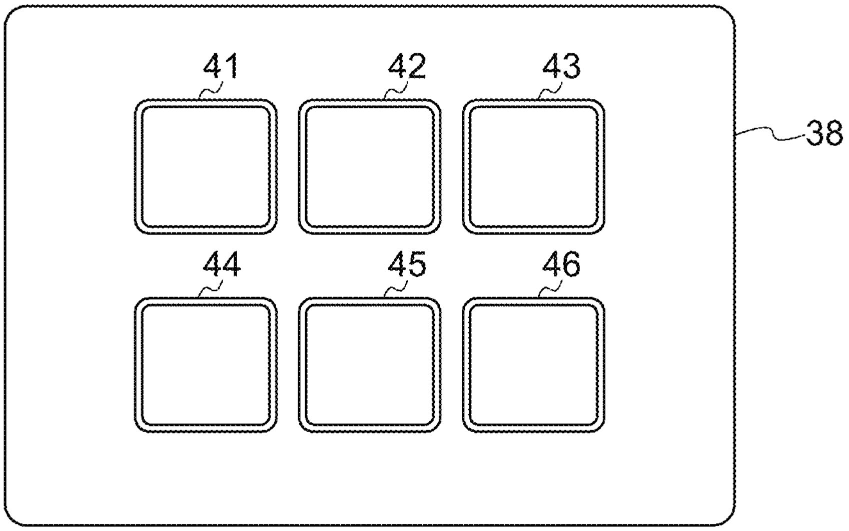
FIG. 15B is a diagram for explaining a configuration of a maneuvering panel in the third example embodiment of the present invention.

Next, a third example embodiment of the present invention will be described. In the present example embodiment, it is assumed that the marine vessel 1 includes five outboard motors 3 arranged in parallel at the stern, for example. FIG. 15A is a diagram for explaining a configuration of a remote controller 37 in the present example embodiment, and FIG. 15B is a diagram for explaining a configuration of a maneuvering panel 38 in the present example embodiment.

The remote controller 37 (manual operator) includes the lever 10 (control) configured to control the thrust generated by each outboard motor 3, a power switch 39 to turn on and off the power of the maneuvering system 11 that includes the outboard motors 3, and a start switch 40. In addition, unlike the maneuvering panel 15, the maneuvering panel 38 (manual operator) includes touch buttons 41 to 46 (maneuvering function display) configured as physically operable hardware keys. When the vessel operator presses any of the touch buttons 41 to 46, an instruction to execute a function (maneuvering function) or a maneuvering mode (maneuvering function) assigned to the pressed touch button is transmitted from the maneuvering panel 38 to the BCU 12. Functions or maneuvering modes assigned to the touch buttons 41 to 46 are displayed on the pressing surfaces of the respective touch buttons 41 to 46. The maneuvering panel 38 incorporates an LCD panel, and the touch buttons 41 to 46 display their respective functions or maneuvering modes by allowing light emitted from the LCD panel to pass therethrough. The functions or maneuvering modes assigned to the touch buttons 41 to 46 can be changed by a control from the BCU 12 or settings made by the vessel operator, and the functions or maneuvering modes displayed on the touch buttons 41 to 46 are updated accordingly.

In the present example embodiment, the remote controller 37 is turned on before a function or maneuvering mode is executed by pressing one of the touch buttons 41 to 46. Examples of methods to turn on the power of the remote controller 37 include operating a power switch (not illustrated) provided on the remote controller 37 or performing hull authentication using a wearable device worn by the vessel operator. At this time, the functions or maneuvering modes are not yet displayed on the touch buttons 41 to 46 (FIG. 15B).

Figure 16A:
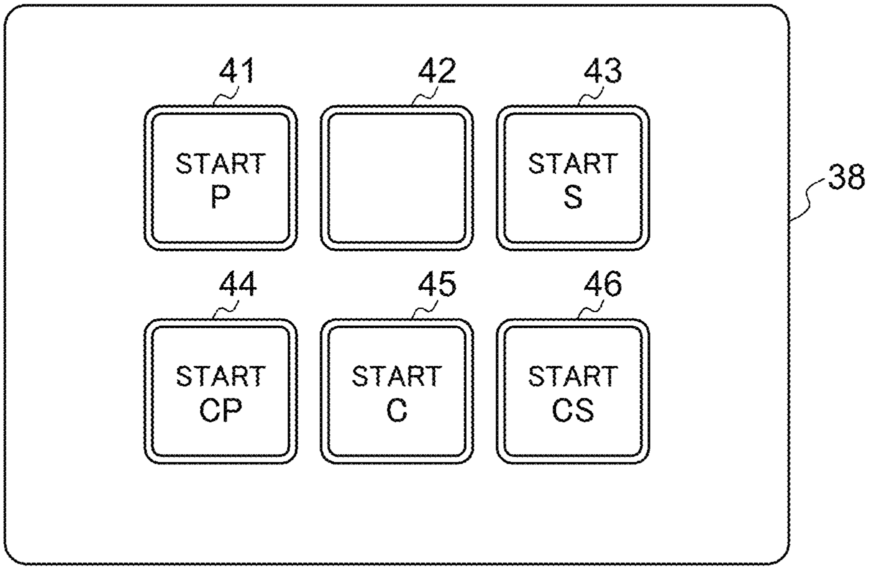
FIGS. 16A to 16C are diagrams for explaining changes in functions and maneuvering modes assigned to touch buttons of the maneuvering panel in the third example embodiment of the present invention.

Thereafter, when the vessel operator presses the power switch 39 of the remote controller 37, the start switch 40 is activated, and the touch buttons 41 and 43 to 46 function as switches to individually start the engines of the respective outboard motors 3. Specifically, the touch button 41 is assigned a function to control the start and stop of the engine of the outboard motor 3 on the farthest port side, and a character string "START P" is displayed thereon. The touch button 43 is assigned a function to control the start and stop of the engine of the outboard motor 3 on the farthest starboard side, and a character string "START S" is displayed thereon. The touch button 44 is assigned a function to control the start and stop of the engine of the second outboard motor 3 from the port side, and a character string "START CP" is displayed thereon. The touch button 45 is assigned a function to control the start and stop of the engine of the central outboard motor 3, and a character string "START C" is displayed thereon. The touch button 46 is assigned a function to control the start and stop of the engine of the second outboard motor 3 from the starboard side, and a character string "START CS" is displayed thereon (FIG. 16A). In addition, when the start switch 40 is pressed, the engines of the five outboard motors 3 are sequentially started. Note that no function is assigned to the touch button 42, and no character string corresponding to any function is displayed. Accordingly, no function is executed when the touch button 42 is pressed.

Figure 16B:
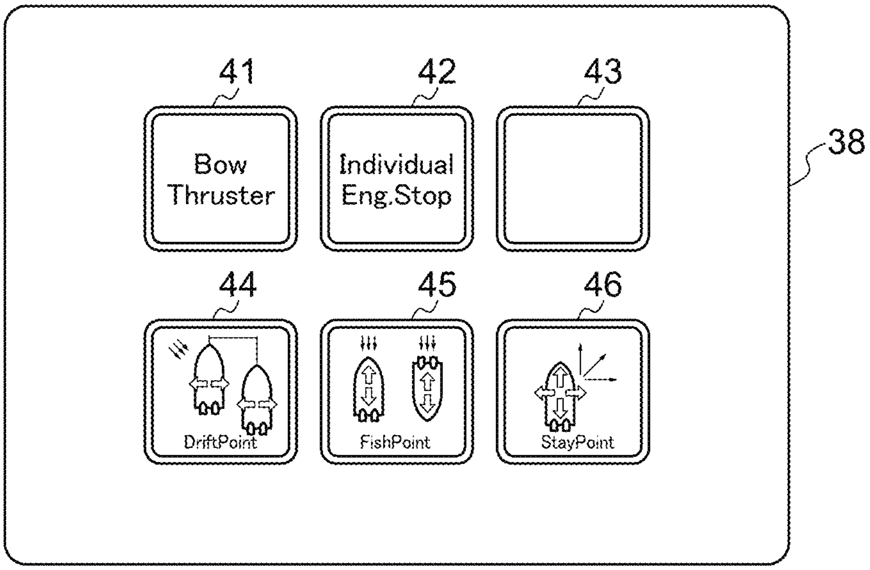

In addition, after the start states of the engines of at least two outboard motors 3 change and these engines start, when the vessel operator moves the lever 10 of the remote controller 37 to the "N" position, the functions assigned to the respective touch buttons 41 to 46 are changed, and functions that are usable while the marine vessel 1 is not traveling are assigned to the respective touch buttons 41 to 46. Specifically, as illustrated in FIG. 16B, the touch button 41 is assigned a function to activate a bow thruster (not illustrated), and a character string "Bow Thruster" is displayed thereon. When the bow thruster is activated, the turning ability and lateral movement speed of the hull 2 are improved in the available modes while not traveling. The touch button 42 is assigned a function to shift the maneuvering panel 38 to a state in which the start and stop of the engine of each outboard motor 3 can be individually controlled, and a character string "Individual Eng. Stop" is displayed thereon. The touch button 44 is assigned the Drift Point™, and a character string "DriftPoint" is displayed thereon. The touch button 45 is assigned the Fish Point™, and a character string "FishPoint" is displayed thereon. The touch button 46 is assigned the Stay Point™, and a character string "StayPoint" is displayed thereon. Note that no function is assigned to the touch button 43, and no character string corresponding to any function is displayed. Accordingly, no function is executed when the touch button 43 is pressed.

As described above, since the display on each of the touch buttons 41 to 46 is implemented with an LCD panel, the display can be freely changed. Therefore, a graphic indicating the features of the Drift Point™ may be displayed on the touch button 44, a graphic indicating the features of the Fish Point™ may be displayed on the touch button 45, and a graphic indicating the features of the Stay Point™ may be displayed on the touch button 46. As a result, a vessel operator who uses these maneuvering modes for the first time can easily understand the control features of each maneuvering mode.

Figure 16C:
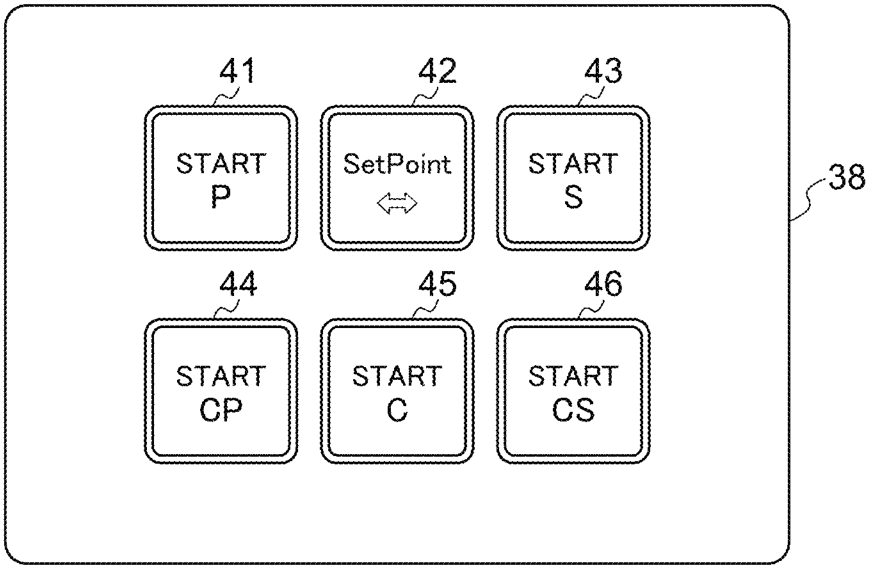

In addition, in a case where the maneuvering panel 38 is in the state illustrated in FIG. 16B, when the touch button 42 is pressed, the functions assigned to the respective touch buttons 41 to 46 are changed, and the maneuvering panel 38 is shifted to a state in which the start and stop of the engine of each outboard motor 3 can be individually controlled. Specifically, as illustrated in FIG. 16C, the touch button 41 is assigned the function to control the start and stop of the engine of the outboard motor 3 on the farthest port side, the touch button 43 is assigned the function to control the start and stop of the engine of the outboard motor 3 on the farthest starboard side, the touch button 44 is assigned the function to control the start and stop of the engine of the second outboard motor 3 from the port side, the touch button 45 is assigned the function to control the start and stop of the engine of the central outboard motor 3, and the touch button 46 is assigned the function to control the start and stop of the engine of the second outboard motor 3 from the starboard side. Further, the touch button 42 is assigned a function to shift the maneuvering panel 38 to a state in which a function that is usable while the marine vessel 1 is not traveling can be selected, and a character string "SetPoint" is displayed thereon. When the touch button 42 is pressed, the functions assigned to the touch buttons 41 to 46 are changed, and the maneuvering panel 38 is shifted to the state illustrated in FIG. 16B.

In addition, when the vessel operator moves the lever 10 of the remote controller 37 to the "F" position, functions that are usable while the marine vessel 1 is traveling are assigned to the respective touch buttons 41 to 46.

Figure 17A:
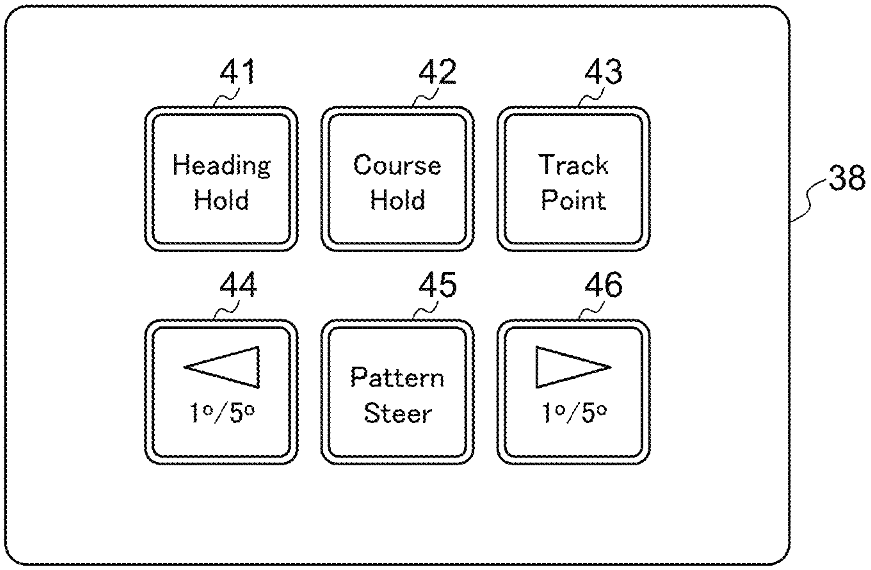
FIGS. 17A to 17C are diagrams for explaining changes in functions and maneuvering modes assigned to the touch buttons of the maneuvering panel in the third example embodiment of the present invention.

Specifically, as illustrated in FIG. 17A, the touch button 41 is assigned a heading direction maintenance mode, and a character string "HeadingHold" is displayed thereon. The heading direction maintenance mode is a maneuvering mode in which the heading direction of the traveling marine vessel 1 is maintained at a predetermined direction, even in the presence of a tidal stream or wind flow, in consideration of their influence on the marine vessel 1. The touch button 42 is assigned the course maintenance mode, and a character string "CourseHold" is displayed thereon. The touch button 43 is assigned the track point mode, and a character string "TrackPoint" is displayed thereon. The touch button 45 is assigned the pattern maneuvering mode, and a character string "PatternSteer" is displayed thereon. The touch button 44 is assigned a heading direction correction function, and a leftward arrow and a character string "1°/5°" are displayed thereon. The touch button 46 is also assigned a heading direction correction function, and a rightward arrow and a character string "1°/5°" are displayed thereon.

The touch buttons 44 and 46 are used while the heading direction maintenance mode or the course maintenance mode is being executed. For example, when the touch button 44 is pressed for less than a predetermined period of time, the heading direction of the marine vessel 1 is changed by one degree to the left, and when the touch button 44 is pressed for the predetermined period of time or longer, the heading direction of the marine vessel 1 is changed by five degrees to the left. In addition, when the touch button 46 is pressed for less than a predetermined period of time, the heading direction of the marine vessel 1 is changed by one degree to the right, and when the touch button 46 is pressed for the predetermined period of time or longer, the heading direction of the marine vessel 1 is changed by five degrees to the right.

Figure 17B:
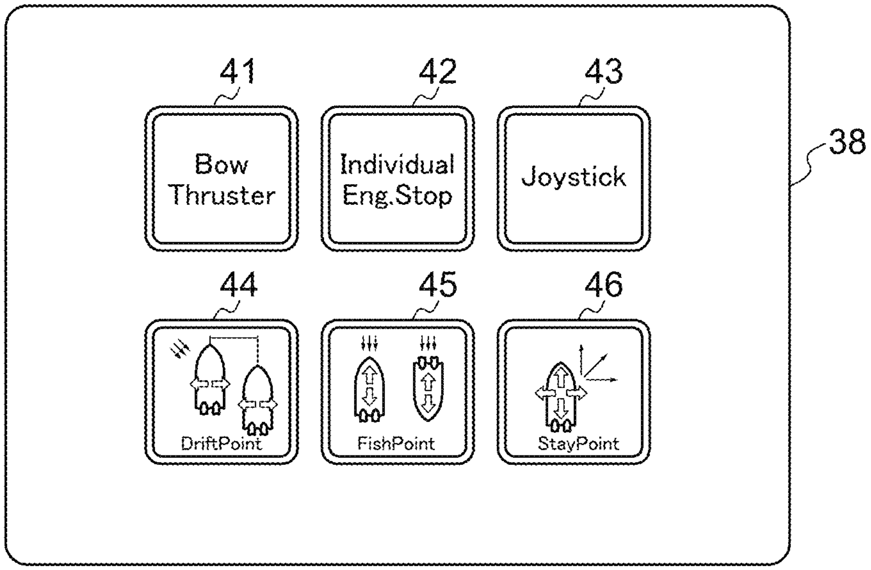

Further, as described above, since the functions or maneuvering modes assigned to the touch buttons 41 to 46 can be changed through settings made by the vessel operator, the vessel operator may assign a certain function to a touch button that is not currently assigned any function. For example, when the maneuvering panel 38 is in the state illustrated in FIG. 16B, the joystick mode may be assigned to the touch button 43. In this case, a character string "Joystick" is displayed on the touch button 43 (FIG. 17B).

Figure 17C:
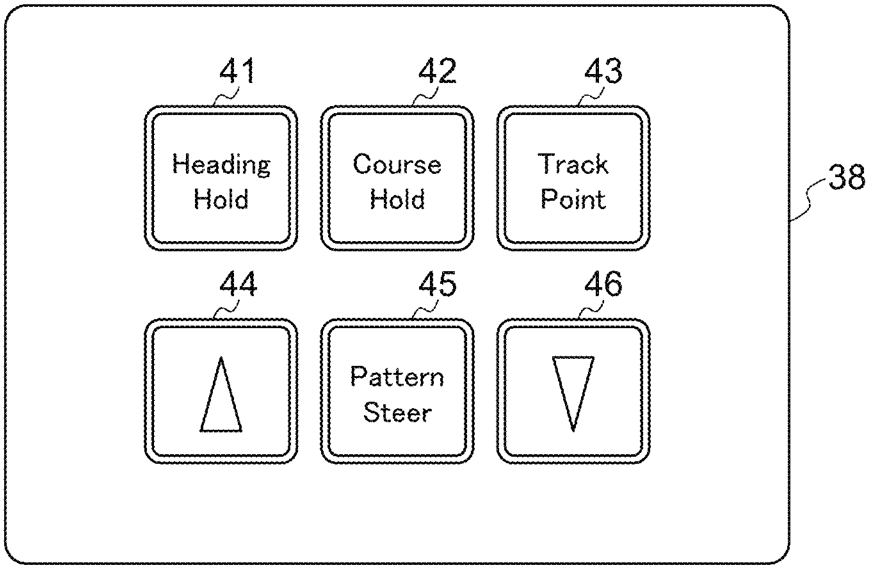

Further, in the present example embodiment, a predetermined function is assigned to each of the touch buttons 41 to 46 according to the state of the power switch 39 of the remote controller 37, the start state of the engine of each outboard motor 3, and the operation state of the lever 10 of the remote controller 37. However, any function may be displayed on the touch buttons 41 to 46 by the vessel operator regardless of these states. For example, in a state where the vessel operator moves the lever 10 of the remote controller 37 to the "F" position, a thrust changing function may be displayed on the touch buttons 44 and 46 instead of the heading direction correction function. In this case, an upward arrow is displayed on the touch button 44, and a downward arrow is displayed on the touch button 46 (FIG. 17C). When the touch button 44 is pressed, the thrust of each outboard motor 3 increases stepwise according to the number of times of pressing, and when the touch button 46 is pressed, the thrust of each outboard motor 3 decreases stepwise according to the number of times of pressing.

Further, each of the touch buttons 41 to 46 may function as a shortcut key. For example, when the lever 10 of the remote controller 37 has been moved to the "F" position, a function that is originally assignable only when the lever 10 of the remote controller 37 is located at the "N" position may be assigned to any one of the touch buttons 41 to 46 in preparation for stopping the marine vessel. For example, when the maneuvering panel 38 is in the state illustrated in FIG. 17A, the Drift Point™, the Fish Point™, or the Stay Point™ may be assigned to the touch button 44 or the touch button 46. Further, for example, when the lever 10 of the remote controller 37 is located at the "N" position, a function to control the start and stop of the engine may be assigned to any one of the touch buttons 41 to 46 in order to control the start and stop of the engine of each outboard motor 3. For example, when the maneuvering panel 38 is in the state illustrated in FIG. 16B, the function to control the start and stop of the engine of the outboard motor 3 on the farthest port side may be displayed on the touch button 41, the function to control the start and stop of the engine of the central outboard motor 3 may be displayed on the touch button 42, and the function to control the start and stop of the engine of the outboard motor 3 on the farthest starboard side may be displayed on the touch button 43.

Figure 18:
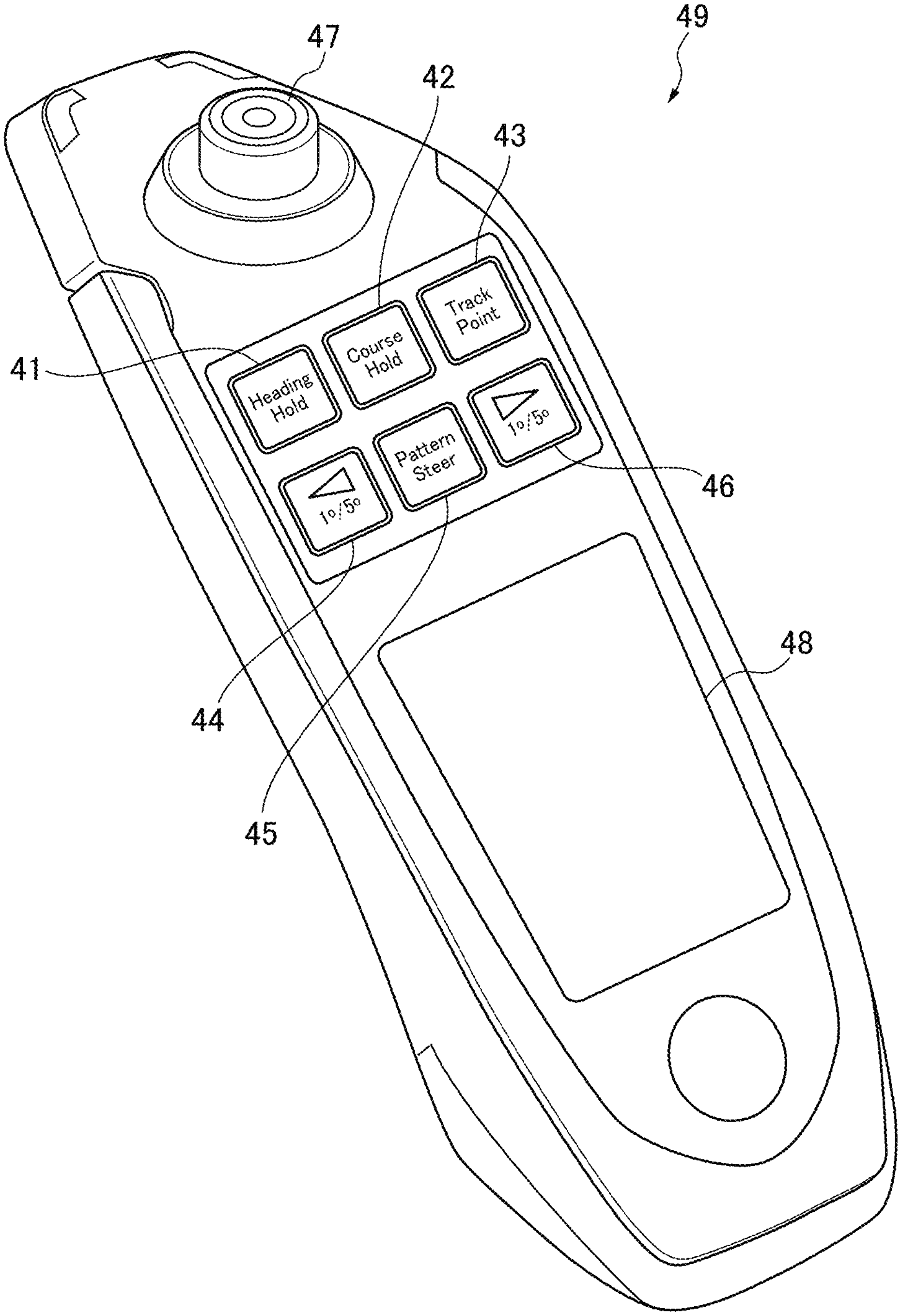
FIG. 18 is a diagram illustrating a wearable device including an arrangement of the touch buttons in the third example embodiment of the present invention.

The maneuvering panel 38 is typically located in the cockpit 4, but the location of the maneuvering panel 38 is not limited to the cockpit 4. For example, instead of the maneuvering panel 15, the maneuvering panel 38 may be located in or on the steering mechanism 5, the joystick 7, or the remote controller 37. Furthermore, the touch buttons 41 to 46 may be located on a device other than the components of the marine vessel 1. For example, as illustrated in FIG. 18, the touch buttons 41 to 46 may be located on a handheld wearable device 49 including a small joystick 47 and a small MED 48.

According to the present example embodiment, functions or maneuvering modes assigned to the respective touch buttons 41 to 46 are changed according to the state of the power switch 39 of the remote controller 37, the start state of the engine of each outboard motor 3, and the operation state of the lever 10 of the remote controller 37. Specifically, each of the touch buttons 41 to 46 is assigned a function or maneuvering mode that is usable in the navigation state (traveling or not traveling) of the marine vessel 1 corresponding to the state of the power switch 39 of the remote controller 37, the start state of the engine of each outboard motor 3, and the operation state of the lever 10 of the remote controller 37. As a result, the vessel operator can use functions or maneuvering modes suitable for the navigation state of the marine vessel 1 without having to manually change the functions or maneuvering modes assigned to the respective touch buttons 41 to 46, thus improving the usability of the maneuvering panel 38.

Further, in the present example embodiment, since the touch buttons 41 to 46 are configured as hardware keys, the reliability of pressing them is improved compared to software keys, even when the vessel operator operates them with wet hands. As a result, it becomes less likely that a function or maneuvering mode intended by the vessel operator fails to be executed.

Further, in the present example embodiment, when the number of usable functions and maneuvering modes is less than the number of touch buttons 41 to 46 (six), no function or maneuvering mode is assigned to extra touch buttons, and no character string corresponding to any function or maneuvering mode is displayed thereon (see FIGS. 16A and 16B). This makes it less likely that the vessel operator will be confused by an unusable function or maneuvering mode assigned to a touch button.

In addition, in the present example embodiment, since the functions or maneuvering modes assigned to the respective touch buttons 41 to 46 can be changed, for example, even if the number of functions or maneuvering modes executable on the marine vessel 1 increases, the additional functions or maneuvering modes can be assigned to the touch buttons 41 to 46. As a result, the additional functions or maneuvering modes can be executed without increasing the number of touch buttons, thus preventing an increase in cost and providing the ability to expand the number of functions and maneuvering modes. Furthermore, even if the number of functions or maneuvering modes executable on the marine vessel 1 increases, the number of touch buttons in the cockpit 4 or the like does not increase, thus maintaining the appearance and operability.

Although the maneuvering panel 38 includes the six touch buttons 41 to 46, the number of touch buttons in the maneuvering panel 38 is not limited to six and may vary depending on the size of the maneuvering panel 38 or the number of functions and maneuvering modes executable on the marine vessel 1. Further, the assignments of functions or maneuvering modes to the respective touch buttons 41 to 46, as illustrated in FIGS. 16A to 17C, are merely examples. A function or maneuvering mode considered to be frequently used may be assigned to a touch button located at a position where it can be easily operated by the vessel operator (e.g., a position closer to the vessel operator).

Figure 19:
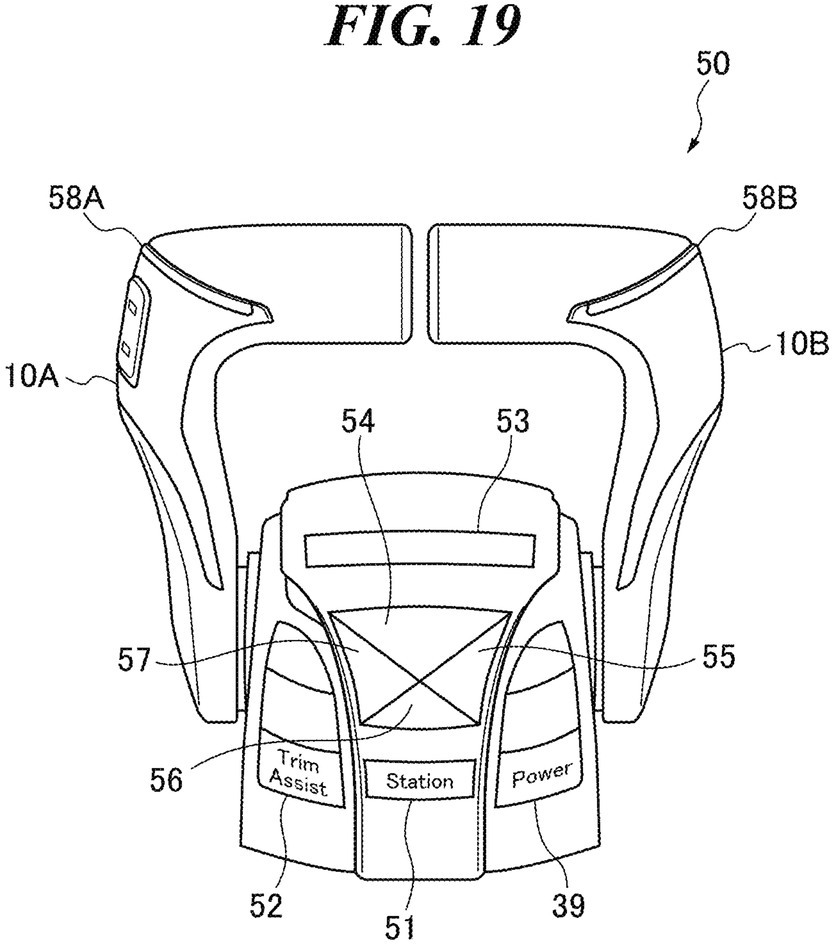
FIG. 19 is a diagram for explaining a configuration of a remote controller in a maneuvering system according to a fourth example embodiment of the present invention.

Next, a fourth example embodiment of the present invention will be described. In the present example embodiment, it is assumed that the marine vessel 1 includes at least three outboard motors 3 arranged in parallel at the stern, for example. FIG. 19 is a diagram for explaining a configuration of a remote controller 50 in the present example embodiment.

The remote controller 50 (manual operator) includes the power switch 39, a helm seat switch 51, and a trim assist switch 52, all of which are configured as physically operable hardware keys. A character string “Power” is printed on the power switch 39. A helm seat switching function is assigned to the helm seat switch 51, and a character string “Station” is printed thereon. The helm seat switching function is a function to prioritize operation at the helm seat where the remote controller 50 is located, when the marine vessel 1 includes a plurality of helm seats, and the helm seat switch 51 is pressed. A trim assist mode is assigned to the trim assist switch 52, and a character string “TrimAssist” is printed thereon. The trim assist mode is a mode to automatically optimize a trim angle of each outboard motor 3 in accordance with the rotation speed of the engine of each outboard motor 3.

The remote controller 50 also includes a display 53 to display a currently executed mode or function, touch buttons 54 to 57 (maneuvering function display) configured as physically operable hardware keys, and levers 10A and 10B corresponding to the outboard motors 3. When the vessel operator presses any of the touch buttons 54 to 57, an instruction to execute a function or maneuvering mode assigned to the pressed touch button is transmitted from the remote controller 50 to the BCU 12. Functions or maneuvering modes assigned to the touch buttons 54 to 57 are displayed on the pressing surfaces of the respective touch buttons 54 to 57. The remote controller 50 incorporates an LCD panel, and the touch buttons 54 to 57 display their respective functions or maneuvering modes by allowing light emitted from the LCD panel to pass therethrough. The functions or maneuvering modes assigned to the touch buttons 54 to 57 can be changed by a control from the BCU 12 or settings made by the vessel operator, and the functions or maneuvering modes displayed on the touch buttons 54 to 57 are updated accordingly. The remote controller 50 further includes two touch buttons 59 and 60 configured as physically operable hardware keys. Predetermined functions are assigned to the touch buttons 59 and 60 by the BCU 12, and the assigned functions are displayed on the pressing surfaces of the respective touch buttons 59 and 60. The touch button 59 is located to the right of the touch buttons 54 to 57, and the touch button 60 is located to the left of the touch buttons 54 to 57.

The levers 10A and 10B respectively include light-emitting portions 58A and 58B, each including, for example, an LED. When the levers 10A and 10B are tilted toward the “F” position, the light-emitting portions 58A and 58B emit, for example, blue light. When the levers 10A and 10B are located at the “N” position, the light-emitting portions 58A and 58B emit, for example, yellow-green light. When the thrust of the outboard motors 3 cannot be controlled by the BCU using the levers 10A and 10B, the light-emitting portions 58A and 58B do not emit light, for example.

Figure 20A:
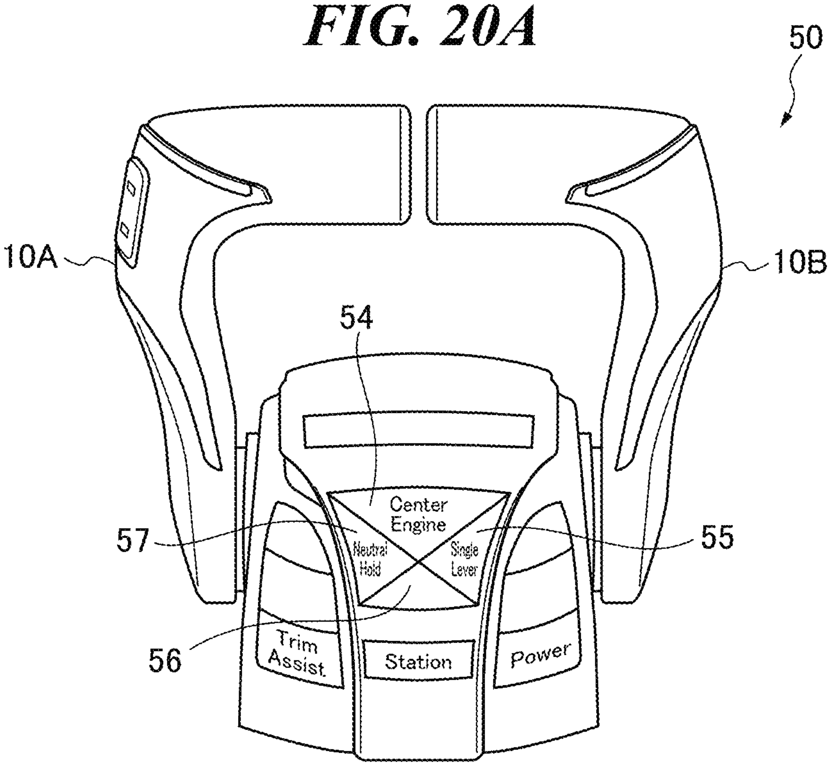
FIGS. 20A and 20B are diagrams for explaining changes in functions and maneuvering modes assigned to touch buttons of the remote controller in the fourth example embodiment of the present invention.

In addition, after the engine of each outboard motor 3 is started, when the vessel operator moves the levers 10A and 10B of the remote controller 37 to the “N” position, functions that are usable while the marine vessel 1 is not traveling are assigned to the respective touch buttons 54 to 57. Specifically, as illustrated in FIG. 20A, the touch button 54 is assigned a center engine mode, and a character string “CenterEngine” is displayed in white thereon. The center engine mode is a mode in which only the engine of the central outboard motor 3 is activated, and only the central outboard motor 3 is used for navigation. In the center engine mode, only the central outboard motor 3 generates thrust regardless of which of the levers 10A and 10B is operated. The touch button 55 is assigned a single lever mode, and a character string “SingleLever” is displayed in white thereon. The single lever mode is a mode in which the thrust of all the outboard motors 3 is controlled solely by the lever 10A. The touch button 57 is assigned a neutral holding mode, and a character string “NeutralHold” is displayed in white thereon. The neutral holding mode is a mode in which, even when the levers 10A and 10B are tilted toward the “F” position or the “R” position, the state in which the engine and the propeller are kept disconnected by the clutch is maintained in each outboard motor 3. In the neutral holding mode, tilting the levers 10A and 10B toward the “F” position or the “R” position does not cause the outboard motors 3 to generate thrust, but increases the rotation speed of the engines of the outboard motors 3. Therefore, the neutral holding mode is used to warm up the engines or to generate power by an alternator. Note that no function is assigned to the touch button 56, and no character string corresponding to any function is displayed. Accordingly, no function is executed when the touch button 56 is pressed.

Figure 20B:
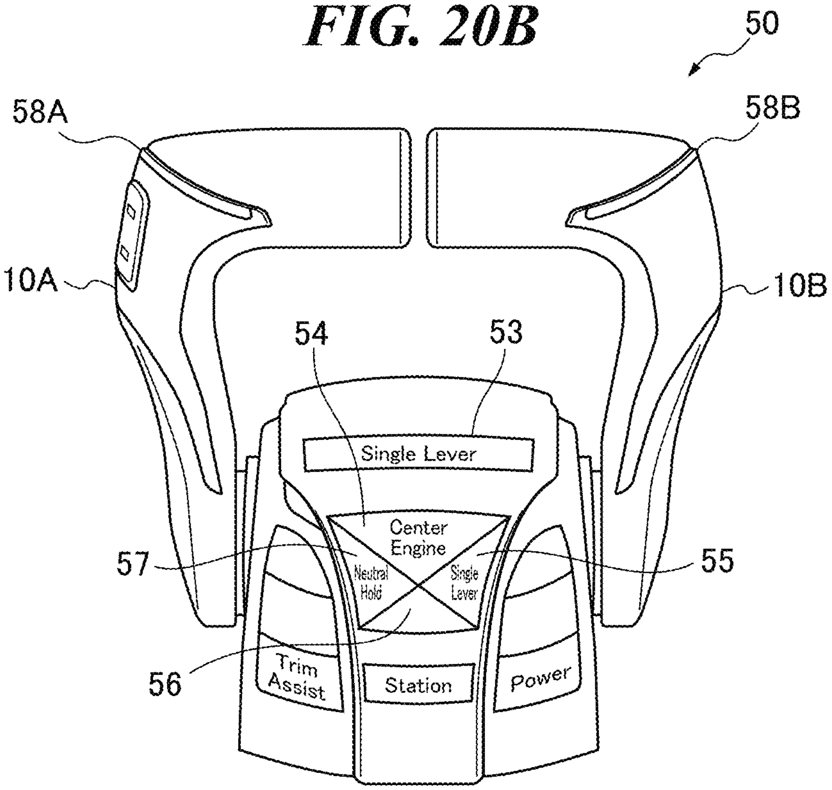

In a case where the remote controller 50 is in the state illustrated in FIG. 20A, when the touch button 55 is pressed while the levers 10A and 10B are located at the “N” position, the single lever mode is executed. In the single lever mode, since the thrust of the outboard motors 3 cannot be controlled by the lever 10B, the light-emitting portion 58B does not emit light, but the light-emitting portion 58A of the lever 10A emits yellow-green light. Furthermore, when the single lever mode is executed, a character string “Single Lever” is displayed on the display 53 (FIG. 20B). When the single lever mode is executed, the character string “SingleLever” on the touch button 55 is displayed in yellow-green light.

Figure 21A:
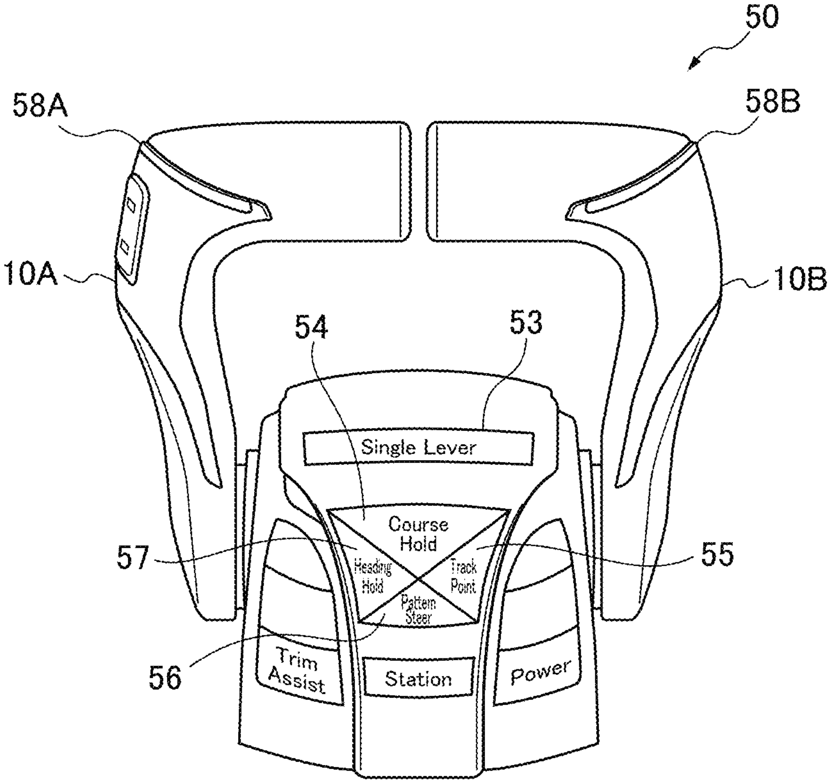
FIGS. 21A and 21B are diagrams for explaining changes in functions and maneuvering modes assigned to the touch buttons of the remote controller in the fourth example embodiment of the present invention.

When the lever 10A is tilted toward the “F” position while the single lever mode is being executed, the light-emitting portion 58A emits blue light, and functions that are usable while the marine vessel 1 is traveling are assigned to the respective touch buttons 54 to 57. Specifically, as illustrated in FIG. 21A, the touch button 54 is assigned the course maintenance mode, and a character string “CourseHold” is displayed in white thereon. The touch button 55 is assigned the track point mode, and a character string “TrackPoint” is displayed in white thereon. The touch button 56 is assigned the pattern maneuvering mode, and a character string “PatternSteer” is displayed in white thereon. The touch button 57 is assigned the heading direction maintenance mode, and a character string “HeadingHold” is displayed in white thereon. Also at this time, the character string “Single Lever” is displayed in white on the display 53.

Next, when the lever 10A is tilted toward the “N” position while the single lever mode is being executed, as illustrated in FIG. 20B, the functions that are usable while the marine vessel 1 is not traveling are again assigned to the respective touch buttons 54 to 57, and the light-emitting portion 58A emits yellow-green light. The display 53 continues to display the character string “Single Lever”, and the character string “SingleLever” on the touch button 55 is displayed in yellow-green light.

Thereafter, when the lever 10A is tilted again toward the “F” position while the single lever mode is being executed, as illustrated in FIG. 21A, the functions that are usable while the marine vessel 1 is traveling are again assigned to the respective touch buttons 54 to 57, and the light-emitting portion 58A emits blue light. Also at this time, the display 53 continues to display the character string "Single Lever."

Figure 21B:
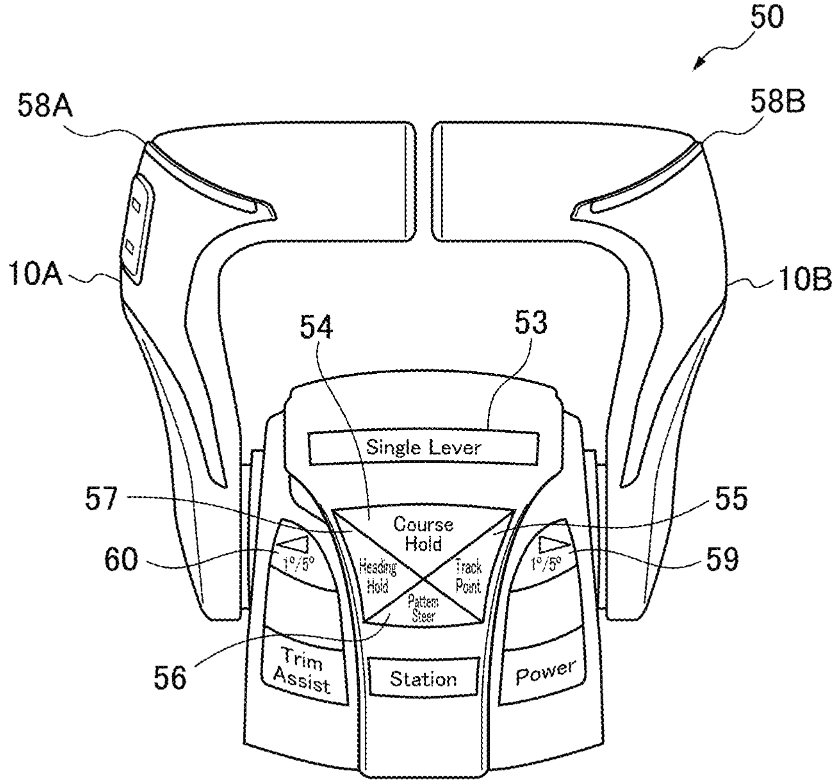

Further, when the touch button 54 is pressed while the single lever mode is being executed and the lever 10A is tilted toward the "F" position, the course maintenance mode is executed. At this time, the character string "CourseHold" on the touch button 54 is displayed in yellow-green light. Additionally, the heading direction correction function is assigned to the touch button 59, and a rightward arrow and a character string "1°/5°" are displayed in white thereon. The heading direction correction function is also assigned to the touch button 60, and a leftward arrow and a character string "1°/5°" are displayed in white thereon (FIG. 21B). When the touch button 59 is pressed for less than a predetermined period of time, the heading direction of the marine vessel 1 is changed by one degree to the right, and when the touch button 59 is pressed for the predetermined period of time or longer, the heading direction of the marine vessel 1 is changed by five degrees to the right, for example. Similarly, when the touch button 60 is pressed for less than a predetermined period of time, the heading direction of the marine vessel 1 is changed by one degree to the left, and when the touch button 60 is pressed for the predetermined period of time or longer, the heading direction of the marine vessel 1 is changed by five degrees to the left, for example. Also at this time, the display 53 continues to display the character string "Single Lever". The touch buttons 59 and 60 are also configured as physically operable hardware keys.

Thereafter, when the touch button 57 is pressed to execute the heading direction maintenance mode, the character string "CourseHold" on the touch button 54 is displayed in white, and the character string "HeadingHold" on the touch button 57 is displayed in yellow-green light. The touch buttons 59 and 60 are still assigned the course correction function. The rightward arrow and the character string "1°/5°" are displayed in white on the touch button 59, and the leftward arrow and the character string "1°/5°" are displayed in white on the touch button 60 (FIG. 21B). When a function or maneuvering mode becomes unusable due to a fault, the character string on the corresponding touch button is displayed in orange, for example.

According to the present example embodiment, functions or maneuvering modes assigned to the respective touch buttons 54 to 57 are changed according to the operation state of the levers 10A and 10B of the remote controller 50. Specifically, each of the touch buttons 54 to 57 is assigned a function or maneuvering mode that is usable in the navigation state (traveling or not traveling) of the marine vessel 1 corresponding to the operation state of the levers 10A and 10B of the remote controller 50. As a result, the vessel operator can use functions or maneuvering modes suitable for the navigation state of the marine vessel 1 without having to manually change the functions or maneuvering modes assigned to the respective touch buttons 54 to 57, thus improving the usability of the remote controller 50.

Further, in the present example embodiment, the touch buttons 54 to 57 are configured as hardware keys, and therefore, unlike software keys, they can be reliably pressed even when operated with wet hands by the vessel operator. As a result, it is possible to prevent a function or maneuvering mode intended by the vessel operator from not being executed. Additionally, since the hardware keys allow for blind operation, the operability of the touch buttons 54 to 57 can be improved.

In addition, in the present example embodiment, since the functions or maneuvering modes assigned to the respective touch buttons 54 to 57 can be changed, for example, even if the number of functions or maneuvering modes executable on the marine vessel 1 increases, the additional functions or maneuvering modes can be assigned to the touch buttons 54 to 57. As a result, the additional functions or maneuvering modes can be executed without increasing the number of touch buttons, thus preventing an increase in cost and providing the ability to expand the number of the functions and maneuvering modes. Furthermore, even if the number of functions or maneuvering modes executable on the marine vessel 1 increases, it is possible to prevent the appearance and operability of the remote controller 50 from being adversely affected by an increase in the number of touch buttons.

Although the remote controller 50 includes the six touch buttons 54 to 57, 59 and 60, the number of touch buttons on the remote controller 50 is not limited to six and may vary depending on the size of the remote controller 50 or the number of functions and maneuvering modes executable on the marine vessel 1. Further, the assignments of functions or maneuvering modes to the respective touch buttons 54 to 57, as illustrated in FIGS. 20A to 21B, are merely examples. A function or maneuvering mode considered to be frequently used may be assigned to a touch button located at a position where it can be easily operated by the vessel operator (e.g., a position closer to the vessel operator).

Hitherto, the description has been provided about the example embodiments according to the present invention. However, the present invention is not limited to the above example embodiments, and various variations and changes may be made within the scope of the invention.

For example, the execution record of each maneuvering mode may be shared by a plurality of marine vessels 1. Specifically, the BCU 12 of a certain marine vessel 1 stores an execution record of each maneuvering mode in a server via a network. Then, when the other marine vessels 1 start traveling, the BCU 12 of the other marine vessels 1 may refer to the execution record of each maneuvering mode stored in the server, and switch between display and non-display of each of the touch buttons 20 to 26 or change the display position of each of the touch buttons 20 to 26 based on the reference result.

Further, the present invention may be implemented by the BCU 12 executing a program by reading the program for implementing the functions of the above-described example embodiments from a memory or the like included in the BCU 12. Alternatively, the present invention may be realized by supplying a program for realizing the functions of the above-described example embodiments to the maneuvering system 11 via a network or a storage medium and executing the supplied program by the BCU 12. Furthermore, the present invention may also be realized by a circuit (for example, ASIC) that realizes one or more functions of the BCU 12.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A display control method of controlling a plurality of maneuvering function displays, the display control method comprising:

displaying, on each of the plurality of maneuvering function displays, a maneuvering function of a marine vessel assigned to the maneuvering function display; and changing the maneuvering function assigned to each of the plurality of maneuvering function displays based on at least one of a start state of a marine propulsion device of the marine vessel or an operation state of a manual operator of the marine vessel; wherein the plurality of maneuvering function displays are each provided on a touch button that is configured as a physically operable hardware key.

2. The display control method according to claim 1, wherein the manual operator is configured to control a thrust generated by the marine propulsion device, the display control method further comprising:

displaying a maneuvering function that is usable while the marine vessel is traveling on each of the plurality of maneuvering function displays when the manual operator is moved to a position where the marine propulsion device generates thrust; and displaying a maneuvering function that is usable while the marine vessel is not traveling on each of the plurality of maneuvering function displays when the manual operator is moved to a position where the marine propulsion device does not generate thrust.

3. The display control method according to claim 1, wherein the manual operator is a remote controller or a maneuvering panel; and the plurality of maneuvering function displays are arranged on the manual operator.

4. The display control method according to claim 1, further comprising:

assigning a maneuvering function to a maneuvering function display at a position closer to a vessel operator than other maneuvering function displays.

5. A maneuvering system of a marine vessel, the system comprising:

a plurality of maneuvering function displays to display maneuvering functions of the marine vessel assigned thereto; and a controller configured or programmed to change a maneuvering function assigned to each of the plurality of maneuvering function displays based on at least one of a start state of a marine propulsion device of the marine vessel or an operation state of a manual operator of the marine vessel; wherein the plurality of maneuvering function displays are each provided on a touch button that is configured as a physically operable hardware key.

6. The maneuvering system according to claim 5, wherein the manual operator is configured to control a thrust generated by the marine propulsion device; and the controller is configured or programmed to:

display a maneuvering function that is usable while the marine vessel is traveling on each of the plurality of maneuvering function displays when the manual operator is moved to a position where the marine propulsion device generates thrust; and display a maneuvering function that is usable while the marine vessel is not traveling on each of the plurality of maneuvering function displays when the manual operator is moved to a position where the marine propulsion device does not generate thrust.

* * * * *